United States Patent
Billings et al.

(10) Patent No.: US 9,586,853 B2
(45) Date of Patent: Mar. 7, 2017

(54) METHOD OF MAKING OPTICAL FIBERS IN A REDUCING ATMOSPHERE

(71) Applicant: Corning Incorporated, Corning, NY (US)

(72) Inventors: Amanda Lee Billings, Wilmington, NC (US); Dana Craig Bookbinder, Corning, NY (US); Robert Brett Desorcie, Painted Post, NY (US); Liam Ruan de Paor, Hampstead, NC (US); Pushkar Tandon, Painted Post, NY (US); Li Yang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/734,122

(22) Filed: Jun. 9, 2015

(65) Prior Publication Data

US 2016/0009589 A1    Jan. 14, 2016

Related U.S. Application Data

(60) Provisional application No. 62/022,311, filed on Jul. 9, 2014.

(51) Int. Cl.
*G02B 6/02* (2006.01)
*C03B 37/014* (2006.01)
(Continued)

(52) U.S. Cl.
CPC .. *C03B 37/01446* (2013.01); *C03B 37/01211* (2013.01); *C03B 37/01248* (2013.01);
(Continued)

(58) Field of Classification Search
None
See application file for complete search history.

(56) References Cited

U.S. PATENT DOCUMENTS

| 4,515,612 A | 5/1985 | Burrus, Jr. et al. |
| 4,623,373 A | 11/1986 | Stone |

(Continued)

FOREIGN PATENT DOCUMENTS

| EP | 2175295 | 4/2010 |
| JP | 1988295358 | 12/1988 |

(Continued)

OTHER PUBLICATIONS

International Search Report, issued in connection with corresponding PCT application No. PCT/US2015/039650, Sep. 21, 2015.

(Continued)

*Primary Examiner* — Rhonda Peace
(74) *Attorney, Agent, or Firm* — Kevin L. Bray

(57) ABSTRACT

A method for forming an optical fiber preform and fibers drawn from the preform. The method includes forming a soot cladding monolith, inserting a consolidated core cane into the internal cavity, and processing the resulting core-cladding assembly to form a preform. Processing may include exposing the core-cladding assembly to a drying agent and/or dopant precursor, and sintering the core-cladding assembly in the presence of a reducing agent to densify the soot cladding monolith onto the core cane to form a preform. The preform features low hydroxyl content and low sensitivity to hydrogen. Fibers drawn from the preform exhibit low attenuation losses from absorption by the broad band centered near 1380 nm.

25 Claims, 11 Drawing Sheets

(51) Int. Cl.
*C03B 37/012* (2006.01)
*C03B 37/027* (2006.01)

(52) U.S. Cl.
CPC .............. *C03B 37/027* (2013.01); *G02B 6/02* (2013.01); *G02B 6/021* (2013.01); *C03B 2201/075* (2013.01); *C03B 2201/20* (2013.01); *C03B 2203/23* (2013.01); *Y02P 40/57* (2015.11)

(56) References Cited

U.S. PATENT DOCUMENTS

| | | | |
|---|---|---|---|
| 4,641,917 A | 2/1987 | Glodis et al. | |
| 4,675,040 A | 6/1987 | Tanaka et al. | |
| 4,685,945 A | 8/1987 | Freund | |
| 4,852,968 A | 8/1989 | Reed | |
| 5,056,888 A | 10/1991 | Messerly et al. | |
| 5,656,057 A | 8/1997 | Brown et al. | |
| 5,721,800 A | 2/1998 | Kato et al. | |
| 6,009,221 A | 12/1999 | Tsuda | |
| 6,175,680 B1 | 1/2001 | Arai et al. | |
| 6,363,196 B1 | 3/2002 | Rousseau et al. | |
| 6,499,318 B1 | 12/2002 | Lemaire et al. | |
| 6,625,362 B2 | 9/2003 | Inagaki et al. | |
| 6,842,566 B2 | 1/2005 | Ishikawa et al. | |
| 6,901,196 B2 | 5/2005 | Takahashi et al. | |
| 6,904,218 B2 | 6/2005 | Sun et al. | |
| 6,999,667 B2 | 2/2006 | Jang et al. | |
| 7,043,125 B2 | 5/2006 | Diep et al. | |
| 7,164,835 B2 | 1/2007 | Matsuo et al. | |
| 7,203,397 B2 | 4/2007 | Ouchi et al. | |
| 7,239,784 B2 | 7/2007 | Hayami et al. | |
| 7,366,387 B2 | 4/2008 | Matsuo et al. | |
| 7,440,663 B2 | 10/2008 | Matsuo et al. | |
| 7,505,657 B2 | 3/2009 | Matsuo et al. | |
| 7,526,168 B2 | 4/2009 | Matsuo et al. | |
| 7,526,169 B2 | 4/2009 | Bickham et al. | |
| 8,037,717 B2* | 10/2011 | Dawes .............. | C03B 37/01446 65/379 |
| 8,385,701 B2 | 2/2013 | Bookbinder et al. | |
| 8,565,567 B2* | 10/2013 | Hoshino ............ | G02B 6/02042 385/124 |
| 9,067,815 B2* | 6/2015 | Yoshida .............. | C03B 37/0126 |
| 2002/0186941 A1 | 12/2002 | Hsu et al. | |
| 2003/0016927 A1 | 1/2003 | Soufiane et al. | |
| 2003/0079504 A1* | 5/2003 | Boek ................ | C03B 37/01446 65/424 |
| 2003/0190127 A1 | 10/2003 | Sillard et al. | |
| 2003/0223716 A1 | 12/2003 | Christoff et al. | |
| 2004/0114892 A1 | 6/2004 | Chiang et al. | |
| 2005/0063663 A1 | 3/2005 | Anderson et al. | |
| 2005/0144986 A1 | 7/2005 | Bookbinder et al. | |
| 2005/0175303 A1 | 8/2005 | Jang et al. | |
| 2005/0180709 A1 | 8/2005 | Park et al. | |
| 2005/0185906 A1 | 8/2005 | Bickham et al. | |
| 2005/0244119 A1 | 11/2005 | Sasaki et al. | |
| 2006/0039665 A1 | 2/2006 | Matsuo et al. | |
| 2006/0115224 A1 | 6/2006 | Kutami et al. | |
| 2007/0104437 A1* | 5/2007 | Bookbinder ...... | C03B 37/01446 385/125 |
| 2007/0125129 A1* | 6/2007 | Dayanandan ..... | C03B 37/01446 65/414 |
| 2007/0189684 A1 | 8/2007 | Matsuo et al. | |
| 2007/0189699 A1 | 8/2007 | Matsuo et al. | |
| 2008/0101755 A1 | 5/2008 | Matsuo et al. | |
| 2010/0166373 A1 | 7/2010 | Nakanishi et al. | |
| 2010/1663773 | 7/2010 | Nakanishi et al. | |
| 2013/0000840 A1* | 1/2013 | Dawes .............. | C03B 37/01211 156/294 |
| 2013/0129291 A1* | 5/2013 | Hoshino ............ | G02B 6/0281 385/123 |
| 2014/0174133 A1* | 6/2014 | Billings ............ | C03B 37/01413 65/397 |
| 2016/0009588 A1* | 1/2016 | Bookbinder ...... | C03B 37/01205 385/123 |
| 2016/0009589 A1* | 1/2016 | Billings ............ | C03B 37/01211 385/123 |
| 2016/0075591 A1* | 3/2016 | Bookbinder ...... | C03B 37/01453 65/397 |

FOREIGN PATENT DOCUMENTS

| | | |
|---|---|---|
| JP | 01148722 | 6/1989 |
| JP | 2002107555 | 4/2002 |
| JP | 2005206452 | 8/2005 |
| JP | 2005314179 | 11/2005 |
| JP | 2007108764 | 4/2007 |
| WO | 2005021455 | 3/2005 |
| WO | 2009/104724 | 8/2009 |

OTHER PUBLICATIONS

Patent Abstract of Japanese Publication #63-295358; Publication date: Dec. 1, 1988; Kazushige et al.

* cited by examiner

METHOD OF MAKING OPTICAL FIBERS IN A REDUCING ATMOSPHERE

This application claims the benefit of priority under 35 U.S.C. §119 of U.S. Provisional Application Ser. No. 62/022,311 filed on Jul. 9, 2014 the content of which is relied upon and incorporated herein by reference in its entirety.

FIELD

The disclosure is directed to an optical fiber having a high concentration of chlorine and a low concentration of non-bridging oxygen defects in the cladding and to a method for making such fiber. The method includes sintering a preform having a porous chlorine-doped cladding layer in the presence of a reducing agent.

BACKGROUND

Optical communications is an increasingly important area for data transmission because it offers high transmission speeds and high bandwidth. The success of optical communications depends critically on the quality of optical fibers used in data transmission systems. Optical fibers must transfer optical data signals with high fidelity and low attenuation. The main contributions to signal attenuation are scattering losses and absorption. Scattering losses originate primarily from Rayleigh scattering and lead to signal loss through redirection of the optical signal from the fiber to the surroundings. Scattering losses depend both on the wavelength of the optical signal and the composition of the material used to make the optical fiber. The most practical material for optical fibers is silica (with and without dopants). Minimum losses due to Rayleigh scattering in silica occur in the wavelength interval from ~1300 nm to ~1600 nm and optical signal sources that operate in this wavelength interval are widely used in silica-based optical communications systems.

Absorption losses are caused by absorption of the optical signal by impurities in the composition of the optical fiber material. High purity materials are needed to minimize absorption losses. The most significant absorption in the desirable ~1300 nm to ~1600 nm wavelength interval of silica fibers is the "water peak", which is a broad absorption band centered near 1380 nm that extends from ~1350 nm to ~1425 nm. The 1380 nm absorption originates from absorption by OH groups present within or on the surface of silica fibers. The OH groups are primarily bonded to silicon to from silanol (Si—OH) groups. In order to minimize absorption loss in silica fibers, it is necessary to minimize the concentration of silanol groups in the fiber.

Optical fibers are made by drawing fibers from a preform. The preform is consolidated silica glass that includes a series of concentric regions of silica glass that differ in the level or type of dopant. Control of the spatial distribution, concentration, and/or type of dopant in the fiber preform creates regions that differ in refractive index. The differences in refractive index are manifest in fibers drawn from the preform and define the different functional regions of an optical fiber (e.g. core vs. cladding, low index depressions, tailored index profiles). The conventional process for making optical fiber preforms entails deposition of silica soot onto a silica cane. The cane is fully consolidated, becomes the central portion of the fiber preform, and has the composition desired for the core of the fiber ultimately drawn from the preform. The silica soot can be deposited as a single layer with a single composition or a series of layers that differ in composition, where the compositions of the one or more layers are designed to provide the index profile desired in the cladding region of the fiber ultimately drawn from the preform.

Silica soot is usually produced by flame hydrolysis of $SiCl_4$. The water byproduct of the flame hydrolysis reaction leads to high concentrations of OH in the silica soot as well as to high concentrations of OH groups at the surface and in the near-surface region of the cane. To reduce the concentration of OH groups, a dehydration step is performed after soot deposition. In the dehydration step, the soot and cane are exposed to a dehydration agent (e.g. $Cl_2$) that acts to remove OH. The high porosity of the as-deposited soot facilitates removal of OH from the soot layer in the dehydration step. The densified nature of the cane, however, inhibits penetration of the cane by the dehydration agent and significant amounts of OH can remain in the cane portion of the preform. The presence of OH in the preform leads to incorporation of a high concentration of OH in fibers drawn from the preform and to correspondingly high attenuation losses for optical signals at or near 1380 nm.

In addition to the water byproduct of flame hydrolysis, OH can also be incorporated into the fiber preform through reactions of non-bridging oxygens with hydrogen. Non-bridging oxygens are coordinatively unsaturated and can be passivated with hydrogen. The passivation process forms silanol groups and provides OH groups that contribute to signal attenuation through absorption. Fiber preforms often contain a high concentration of non-bridging oxygen groups and the preforms, as well as fibers drawn from the preforms, often exhibit high sensitivity to hydrogen through hydrogen-induced conversion of non-bridging oxygens to silanol groups.

There is a need for fiber preforms that have reduced OH concentration and reduced sensitivity to hydrogen. Fibers drawn from such preforms are expected to have low attenuation losses in the vicinity of 1380 nm.

SUMMARY

The present disclosure is directed to the manufacture of optical fiber having reduced hydrogen sensitivity. In accordance with the present disclosure, a fiber preform is treated with a reducing agent before consolidation. The reducing agent treatment reduces the number of non-bridging oxygen defect centers present in the preform before it is consolidated. After consolidation and subsequent drawing of the consolidated preform into an optical fiber, the optical fiber may be treated with deuterium to further reduce or substantially eliminate non-bridging oxygen defect centers in the fiber so that the hydrogen sensitivity of the optical fiber of the fiber is reduced or eliminated. The use of the reducing agent before final consolidation of the optical fiber preform not only results in greater reduction of the non-bridging oxygen defect centers in fibers drawn from the preform, but also reduces the time required for deuterium treatment of the fibers. As a result, manufacturing output is increased and manufacturing costs are reduced.

In one embodiment, this disclosure is directed to an optical fiber preform formed by the method comprising: forming a soot cladding monolith independent of a core cane, combining the core cane with the soot cladding monolith to form a core-cladding assembly, and processing the core-cladding assembly to form a preform. The method may also include drawing a fiber from the preform.

The core cane may be a consolidated glass and may comprise a silica or doped silica glass. The soot cladding monolith may be formed by depositing one or more layers of silica soot or doped silica soot on a substrate and removing the substrate to provide the soot cladding monolith. The soot cladding monolith may be combined with the core cane to form a core-cladding assembly and the core-cladding assembly may be processed to form a fiber preform.

The substrate may be a bait rod, where removal of the substrate or bait rod provides a soot cladding monolith having an internal cavity. The core cane may be inserted into the internal cavity to form the core-cladding assembly and the core-cladding assembly may be processed to form a preform. The soot cladding monolith may surround the core cane in the core-cladding assembly. A gap may be present between the outer boundary of the core cane and the inner boundary of the surrounding internal cavity of the soot cladding monolith. The internal cavity may extend through the soot cladding monolith. The soot cladding monolith may be annular and may include an internal cavity positioned about the central axis.

The method of making a fiber preform may include dehydration of the soot cladding monolith. The dehydration may occur before and/or after incorporation of the core cane with the soot cladding monolith to form the core-cladding assembly. Dehydration may include exposing the soot cladding monolith and/or the core-cladding assembly to a drying agent. The drying agent may be $Cl_2$, CO, $SiCl_4$, or $SOCl_2$. Dehydration may include heating to a temperature between 600° C. and 1250° C. The drying agent may enter pores of the soot cladding monolith or the space between the core cane and soot cladding monolith. The drying agent may be removed from the environment surrounding the soot cladding monolith and/or core-cladding assembly upon conclusion of dehydration.

The method of making a fiber preform may include doping of the soot cladding monolith. The doping may occur before and/or after incorporation of the core cane with the soot cladding monolith to form the core-cladding assembly. Doping may include exposing the soot cladding monolith and/or core-cladding assembly to a doping precursor. The doping precursor may be $Cl_2$ or a chlorine-containing gas. The doping precursor may enter pores of the soot cladding monolith or the space between the core cane and soot cladding monolith. The doping precursor may be removed from the environment surrounding the soot cladding monolith and/or core-cladding assembly upon conclusion of doping.

The method of making a fiber preform may include exposing the core-cladding assembly to a reducing agent. Exemplary reducing agents include CO, $CHCl_3$, $CH_2Cl_2$ and $CH_3Cl$. Exposure of the core-cladding assembly to the reducing agent may occur after dehydration. Exposure of the core-cladding assembly to the reducing agent may occur in the absence of the drying agent. Exposure of the core-cladding assembly to the reducing agent may occur in the absence of a doping precursor, such as chlorine gas a chlorine-containing gas. Exposure of the core-cladding assembly to the reducing agent may occur before and/or during sintering of the core-cladding assembly. The core-cladding assembly may be heated during exposure to the reducing agent. The temperature of exposure of the core-cladding assembly to the reducing agent may be at least 900° C. The temperature of the core-cladding assembly during exposure to the reducing agent may be sufficient to initiate sintering of the core-cladding assembly.

The method of making a fiber preform may include sintering the core-cladding assembly. The sintering may occur after dehydration or after doping or after treatment of the core-cladding assembly with a reducing agent. The sintering may be concurrent with treatment of the core-cladding assembly with a reducing agent. The sintering may consolidate the soot cladding monolith and fuse the soot cladding monolith with the core cane to form a consolidated fiber preform. Sintering may occur at a temperature greater than 1250° C.

In one aspect, this disclosure is directed to an optical fiber formed by the method comprising: providing a core-cladding assembly, the core-cladding assembly including a consolidated glass core cane inserted in an internal cavity of an independently fabricated soot cladding monolith having at least one porous glass cladding layer; placing the preform in a furnace containing a gas; chlorine doping the porous cladding layer using a chlorine source material, and an optional carrier gas, for example, air, nitrogen, argon or helium; and sintering the at least one porous cladding layer in the presence of a gaseous reducing agent to form a sintered cladding layer on the consolidated glass core, where the at least one sintered cladding layer has a chlorine concentration greater than 500 ppm by weight. The gaseous reducing agent acts to decrease the concentration of oxygen-rich defects in the sintered at least one cladding layer of the consolidated preform and after fully sintering (consolidating) to form an optical fiber preform or blank, an optical fiber is drawn from the sintered preform. The reduction in oxygen-rich defects of the preform due to consolidation of the preform in the presence of a reducing agent includes a reduction in peroxy ($\equiv$Si—O—O—Si$\equiv$) and other oxygen-containing defects that are susceptible to bond cleavage or other modification to form non-bridging oxygen defects (e.g. $\equiv$Si—O— and $\equiv$Si—O.). Fibers drawn from preforms consolidated in the presence of a reducing agent also have a reduced concentration of oxygen-rich defects. The reducing agent is selected from the group consisting of $CH_3Cl$, $CH_2Cl_2$, $CHCl_3$, and CO. In an embodiment, the reducing agent is carbon monoxide (CO). In an embodiment, the gaseous reducing agent is provided with carrier gas. In an embodiment, the carrier gas is an inert gas. In an embodiment, the inert gas is helium. In an embodiment, the chlorine source material is selected from the group consisting of $Cl_2$ and $SiCl_4$.

In an embodiment, the disclosure is directed to a method for manufacturing an optical fiber having a core and a cladding, where the optical fiber has reduced hydrogen sensitivity due to a reduction of oxygen-rich defects in the cladding. In one embodiment, the method comprises forming a reducing agent-treated, consolidated optical fiber preform, where the preform comprises a core portion and a cladding portion and the method includes: providing a core soot preform and consolidating the core soot preform to form the core portion; forming a soot cladding monolith independent of the core portion where the soot cladding monolith contains at least one silica-containing cladding soot layer and an internal cavity; inserting the core portion into the internal cavity of the soot cladding monolith to form a core-cladding assembly; and consolidating the at least one silica-containing cladding soot layer to form the cladding portion over the core portion, wherein the cladding soot is treated with a reducing agent during and/or prior to consolidating the cladding soot to reduce oxygen-rich or non-bridging oxygen defect centers in the cladding. An optical fiber may be drawn from the reducing agent-treated, consolidated optical fiber preform. The optical fiber may then be treated with deuterium. The treatment of the cladding soot with the reducing agent during consolidation reduces the time required to treat the optical fiber with deuterium in order to achieve desired hydrogen sensitivity properties relative to a fiber formed from a preform that was not treated with a reducing agent during consolidation. The reducing agent is selected from the group consisting of $CH_3Cl$, $CH_2Cl_2$, $CHCl_3$, and CO. In an embodiment, the reducing agent is carbon monoxide (CO).

In a further embodiment this disclosure provides a method for manufacturing an optical fiber by forming a reducing agent-treated, consolidated optical fiber preform including a core portion and a cladding portion, the method comprising: consolidating a core soot to form the core portion of the preform; consolidating a silica-containing cladding soot monolith that circumscribes the consolidated core to form the cladding portion over the core portion; and treating the cladding soot with a reducing agent prior to and/or during the consolidation of the cladding soot to form a consolidated optical fiber preform suitable for drawing an optical fiber. Subsequently, an optical fiber may be drawn from the reducing agent-treated, consolidated preform. The drawn optical fiber may then be treated with deuterium. The treatment of the cladding soot with the reducing agent reduces the time required to treat the optical fiber with deuterium in order to achieve desired hydrogen sensitivity properties relative to a fiber formed from a preform that was not treated with a reducing agent during consolidation. The core soot is not treated with a reducing agent prior to and/or during the consolidation of the core soot. The reducing agent is selected from the group consisting of $CH_3Cl$, $CH_2Cl_2$, $CHCl_3$, and CO. In an embodiment, the reducing agent is carbon monoxide (CO).

In an additional embodiment, an optical fiber is provided that is formed by a method comprising: providing a substrate for forming an optical fiber preform; depositing a core soot on the substrate (e.g. bait rod) to form a core soot preform; removing the substrate; consolidating the core soot preform with treatment of the core soot preform by using a reducing agent prior to and/or during the consolidation to reduce oxygen-rich or non-bridging oxygen defect centers in the core soot; inserting the consolidated core in the internal cavity of an independently formed soot cladding monolith having at least one cladding soot layer; and treating the at least one cladding soot layer with a reducing agent prior to and/or during the consolidation to reduce oxygen-rich or non-bridging oxygen defect centers in the cladding soot.

The present disclosure extends to:

A method of producing an optical fiber comprising:

providing a porous soot cladding monolith, said soot cladding monolith including a first porous glass cladding layer and having an internal cavity;

inserting a core cane into said internal cavity to form a core-cladding assembly, said core-cladding assembly including a channel between said core cane and said soot cladding monolith;

exposing said core-cladding assembly to a first gas atmosphere at a first temperature, said first gas atmosphere comprising a chlorine source material, said chlorine source material providing chlorine for doping said first porous glass cladding layer;

exposing said core-cladding assembly to a second gas atmosphere at a second temperature; said second gas atmosphere comprising a reducing agent; and heating said core-cladding assembly in the presence of said second gas atmosphere at a third temperature; said heating causing sintering of said first porous glass cladding layer, said sintered first porous glass cladding layer having a chlorine dopant concentration of at least 500 ppm by weight.

The present disclosure extends to:

A method for forming an optical fiber preform comprising:

providing a soot cladding monolith, said soot cladding monolith including an internal cavity;

inserting a core cane into said internal cavity to form a core-cladding assembly, said core-cladding assembly including said core cane and said soot cladding monolith; and heating said core-cladding assembly in the presence of a reducing agent.

Further features, advantages and details of the present disclosure will be appreciated by those of ordinary skill in the art from a reading of the figures and the detailed description of the preferred embodiments that follow, such description being merely illustrative of the present invention.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale

DETAILED DESCRIPTION

Figure 1:
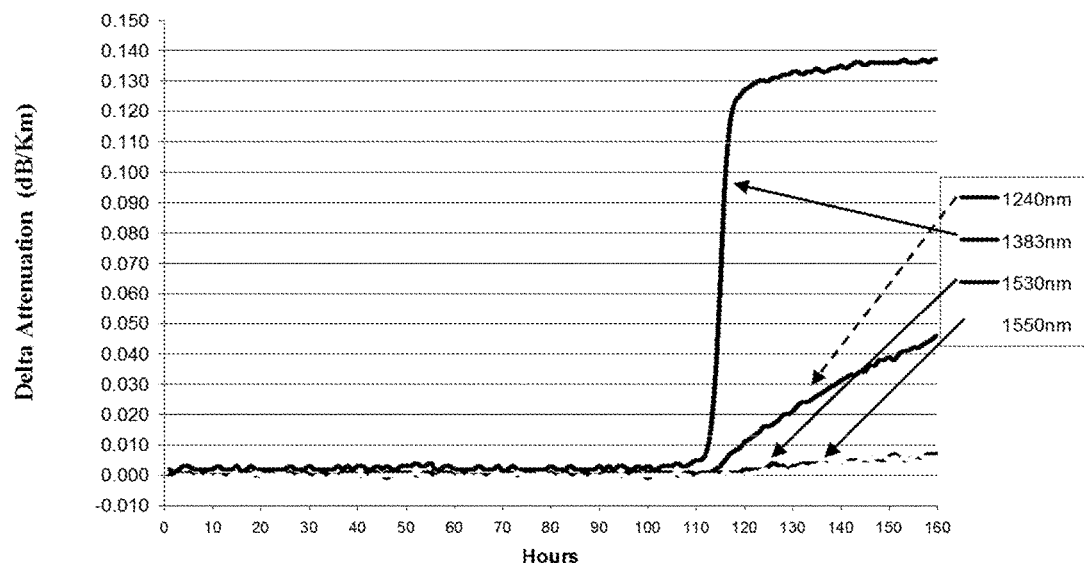
FIG. 1 is an illustration of the typical response of an untreated standard single-mode optical fiber during the hydrogen aging test.

Herein: The terms optical fiber preform(s) and optical fiber blank(s) are used interchangeably. The term "soot" means $SiO_2$ or doped-$SiO_2$ particles; the individual soot particles generally have a size of 0.01 to 10 micrometers in diameter. "Soot preform" means an article made of soot particles that has an open porosity. The terms "porous soot" and "porous glass" are used interchangeably herein. The term "soot cladding monolith" refers to a soot preform that is formed independent of a core cane and includes one or more porous cladding layers. The soot cladding monolith may include an internal cavity. The term "core cane" refers to consolidated glass and may comprise a silica or doped silica glass. The term "consolidated glass" refers to glass in a closed pore state. In some embodiments, the glass is void-free. The term "soot-to-glass transformation" refers to the process of going from a porous glass state to a closed porosity state. The term "sintering" refers to the process of going from a porous glass state to a closed porosity state. As described more fully hereinbelow, the soot-to-glass transformation process may include a dehydration step, a doping step, and a sintering step. In some embodiments, the glass becomes void-free in the soot-to-glass transformation process. The term optical fiber preform (or consolidated preform, sintered preform or blank) refers to a glass article from which an optical fiber can be drawn. The term Time-to-Peak (TTP) refers to the time elapsed after exposure of a fiber to a hydrogen-nitrogen gas mixture at 23° C. and 1 atm pressure (1% by volume $H_2$ and 99% by volume $N_2$) at which a sharp increase (>0.005 dB/km) in attenuation is observed at 1383 nm.

Herein an "up-dopant" is a dopant that raises the refractive index of a silica ("$SiO_2$") glass relative to that of pure undoped $SiO_2$; that is, the up-dopant causes the glass refractive index to increase. Also herein a "down-dopant" is a dopant that lowers the refractive index of a silica glass relative to that of pure undoped $SiO_2$ glass. Examples, without limitation, of up-dopants include Ge, Al, P, Ti, Cl, and Br. Examples, without limitation, of down-dopants include non-periodic voids, fluorine and boron. Dopant concentrations in the preform and/or fiber are expressed herein on the basis of weight (e.g., ppm by weight, ppm (by weight), percent by weight, wt %).

As used herein the phrase "optical fiber having improved bend performance" means an optical fiber made using the teachings of the present disclosure. Fibers in accordance with the present disclosure exhibit lower transmission losses when curved or bent relative to optical fibers that have not been subjected to the methods and treatments disclosed herein. The methods and treatments disclosed herein are directed to the use of a combination of a gaseous reducing agent and chlorine or a chlorine-containing gas during sintering of an optical fiber preform and are applicable to any bendable optical fiber. For example, the methods and treatments disclosed herein can be used to further improve the "Low Bend Loss Optical Fiber" described in U.S. Pat. No. 8,385,701 (the '701 patent). The '701 patent is completely silent on methods for countering the negative effects of chlorine on signal intensity in optical fibers that have greater than 2000 ppm Cl in the overclad. Optical fibers described herein can have diameters of 50 to 300 microns. Optical fibers measured for time-to-peak hydrogen aging are 125 microns in diameter unless otherwise stated.

As used herein, "reducing agent" refers to any gas which reduces the oxidation state of the glass. A reducing agent, for example, reduces the concentration of oxygen-rich defect centers in the glass. Oxygen-rich defect centers include, but are not limited to, non-bridging oxygen hole centers, peroxy linkages, and peroxy radicals.

As used herein, "dehydration atmosphere" or "drying atmosphere" refers to a gas atmosphere that contains a "drying gas"; and "drying gas", as used herein, refers to a gas or gas mixture including a desired and suitable drying agent. A drying agent is a compound for drying that acts by removing water and/or hydroxyl ions in a soot preform. Exemplary drying agents without limitation include: $CCl_4$, $Cl_2$, $Br_2$, $SOCl_2$, CO, and $SiCl_4$. For example and without limitation, a "drying gas" may be He, a mixture of He and $N_2$, and one of $Cl_2$, $CCl_4$, $SiCl_4$, and/or other drying agents. In some embodiments the drying gas includes a drying agent selected from the group consisting of $Cl_2$ and $SiCl_4$. Concentrations of components in the gas phase are expressed herein on the basis of volume (e.g., ppm by volume, ppm (by volume), percent by volume, vol %).

As used herein, "consolidation" or "soot-to-glass consolidation" refers to heating a soot preform to temperatures of at least about 800° C. to perform various process steps such as drying, doping and sintering. In one embodiment, consolidation occurs over a temperature of 800° C. to 1550° C. The stage of consolidation at which the soot preform is heated temperatures below 1050° C. may be referred to herein as the pre-heat step or pre-heating step of consolidation. The pre-heating step may occur at a temperature in the range from 800° C. to 1050° C. In one embodiment, drying and doping are completed in the pre-heating step of consolidation. The stage of consolidation at which the soot preform is heated to a temperature between 1050° C. and 1300° C. may be referred to herein as the intermediate heat step or intermediate heating step of consolidation. The stage of consolidation at which the soot preform is heated to a temperature of at least 1300° C. may be referred to herein as the sinter step or sintering step of consolidation. The sintering step may occur at a temperature in the range from 1300° C. to 1550° C., or at a temperature above 1550° C. It is expected that densification of the soot to form glass (e.g. to form vitreous or fused silica, or a doped fused silica) occurs primarily in the sintering step (but may also occur at the intermediate heating step and/or the pre-heating step). Doping the preform with chlorine using chlorine gas or a chlorine-containing dopant precursor may occur during one or more of the pre-heating step, intermediate heating step, and sintering step. Also herein the numeral 10 is used to represent both the "core glass cane" used in forming an optical fiber and the "core of the optical fiber" in order to avoid confusion.

As used herein, "baseline attenuation" means attenuation of the fiber at 1550 nm as measured by Optical Time Domain Reflectometry (OTDR) prior to $H_2$ exposure.

As used herein, "cladding" refers to a glass layer or a plurality of glass layers surrounding an optical fiber core and extending from the outer edge of the core to the outer edge of the optical fiber; and the term "overclad" or "outer clad" and similar terms refer to the last cladding layer on the optical fiber (the outermost, most radially distant cladding layer).

The present disclosure is described more fully below with reference to the accompanying drawings. However, this disclosure may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
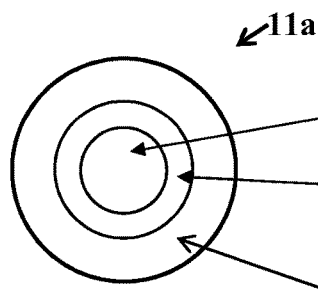
FIG. 2A is a diagram illustrating an up-doped overclad profile for making a low bend loss optical fiber.
Figure 2B:
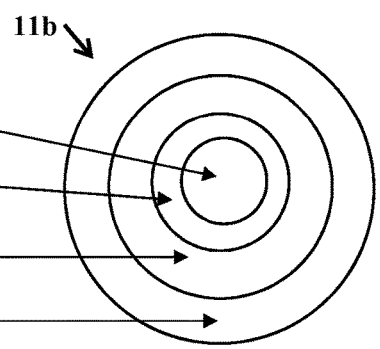
FIG. 2B is a diagram illustrating an up-doped overclad profile with trench for making a low bend loss optical fiber.
Figure 3A:
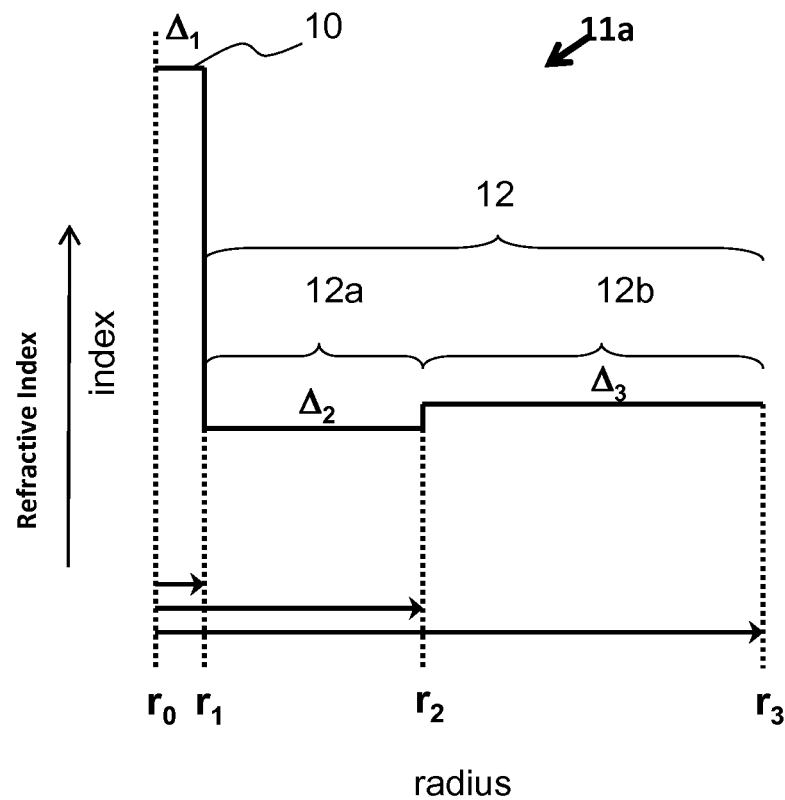
FIG. 3A is an exemplary relative refractive index profile of the optical fiber illustrated in FIG. 2A, the core extending from $r_0$ to $r_1$ and having an index $\Delta_1$, the inner cladding extending from $r_1$ to $r_2$ and having an index $\Delta_2$, and the over cladding extending from $r_2$ to $r_3$ and having an index $\Delta_3$.
Figure 3B:
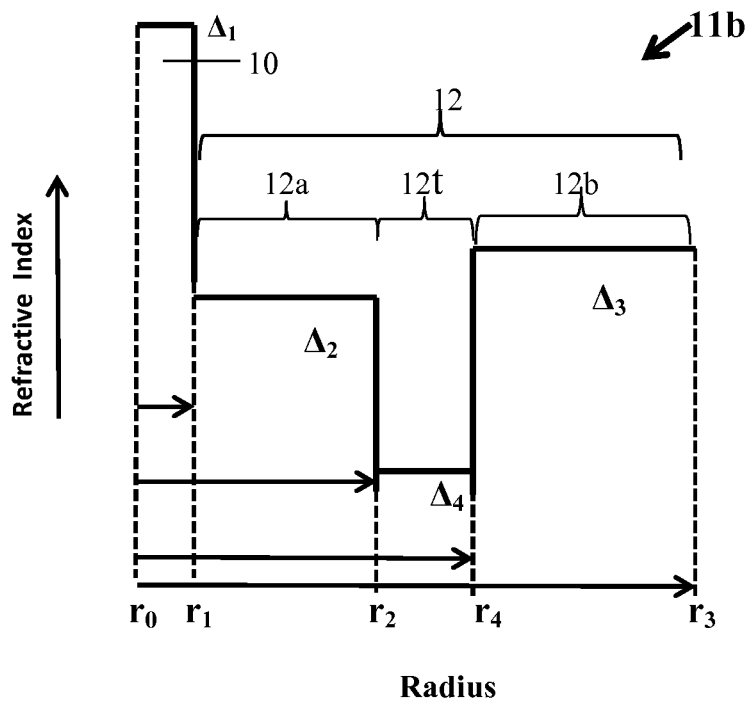
FIG. 3B is an exemplary relative refractive index profile of the optical fiber illustrated in FIG. 2B, the core extending from $r_0$ to $r_1$ and having an index $\Delta_1$, the inner cladding extending from $r_1$ to $r_2$ and having an index $\Delta_2$, a trench of a low refractive index material extending from $r_2$ to $r_4$, and having a refractive index of $\Delta_4$ and the over cladding extending from $r_4$ to $r_3$ and an index $\Delta_3$.

Optical fibers generally consist of a core fiber for transmission of light and one or more cladding layers whose purpose is to keep the transmitted light within the core and reduce the transmission loss over distance. An exemplary step index optical fiber is shown in FIG. 2A. The optical fiber 11a includes a core 10, an inner cladding 12a and an outer cladding 12b. A relative refractive index profile for the optical fiber 11a of FIG. 2A is shown in FIG. 3A. The core 10 extends radially from a core center $r_0$ to a core outer edge $r_1$ and has an index $\Delta_1$. The inner cladding 12a extends radially from the core outer edge $r_1$ to the radial distance $r_2$ and has an index $\Delta_2$. The outer cladding 12b extends radially from $r_2$ to the outer edge of fiber at $r_3$ and has an index $\Delta_3$. It will be appreciated from the description herein that optical fibers of alternative suitable constructions can be formed in accordance with the present invention. In some embodiments, there is a trench region designated 12t between the inner and outer cladding regions. A trench region reduces the sensitivity of the optical fiber to bending loss. An example of such a profile is shown as optical fiber 11b in FIG. 2B, which has the relative refractive index profile shown in FIG. 3B. In FIG. 3B, the core 10 extends radially from a core center $r_0$ to a core outer edge $r_1$ and has an index $\Delta_1$. The inner cladding 12a extends radially from the core outer edge $r_1$ to the radial distance $r_2$ and has an index $\Delta_2$. The trench region 12t extends radially from $r_2$ to radial distance at $r_4$ and has an index $\Delta_4$. The outer clad region 12b extends radially from $r_4$ to the outer edge of fiber at $r_3$ and has an index $\Delta_3$. The index $\Delta_3$ of the outer clad region is higher than the index in the inner cladding region $\Delta_4$ as a result of up-doping of the outer cladding region with chlorine. The index $\Delta_4$ of trench region 12t is achieved by doping the region with a down-dopant such as fluorine.

In addition, optical fibers with an up-doped overclad are being used to improve the bend loss performance. Referring to FIG. 2A, The up-doping of the outer clad 12b with respect to inner clad 12a reduces the fiber cutoff, thereby allowing for increased amount of moat volume that can be accommodated, and the fiber is able to meet the 22 meter ("22 m") "cabled cutoff" requirement of 1260 nm.

Figure 4:
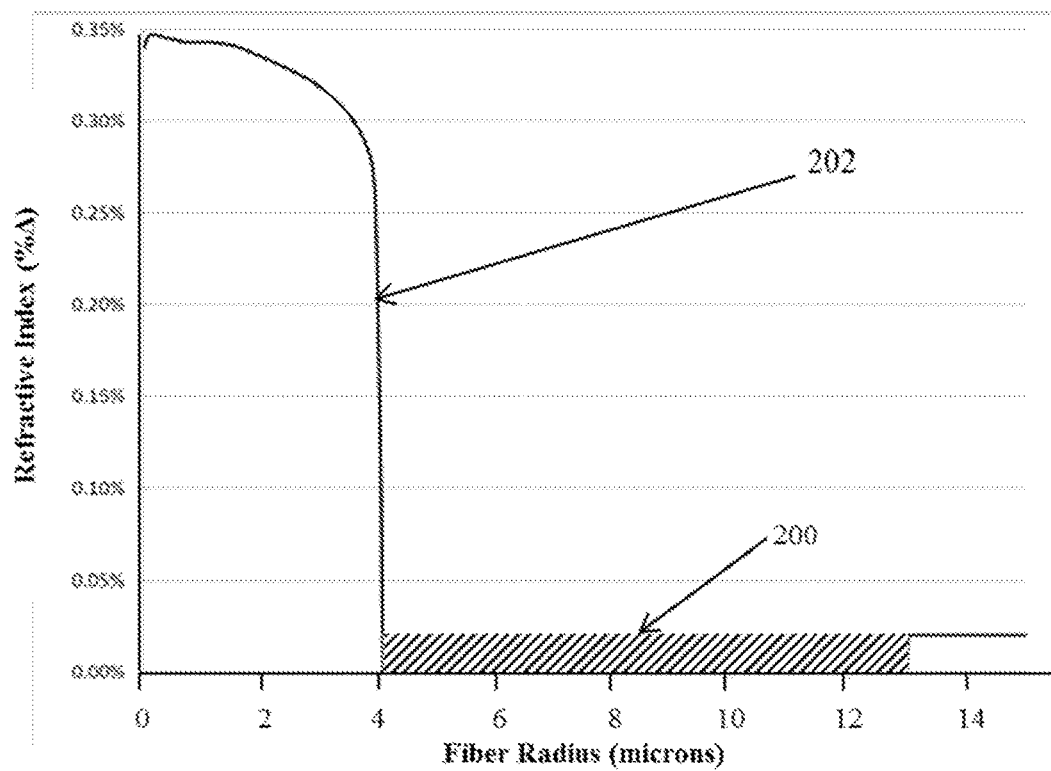
FIG. 4 is a diagram of a step index optical fiber illustrating the "moat volume 200" discussed herein.

The moat volume is the radially-weighted volume of the refractive index well that is constituted by the inner cladding whenever the refractive index of the outer cladding or overclad is up-doped. FIG. 4 is a diagram of a step index optical fiber that illustrates moat volume. Moat volume is depicted as the hatched section designated by reference numeral 200. The depiction in FIG. 4 is limited to a radial position of about 15 μm for purposes of illustration. As is recognized by those of skill in the art, the actual radius of the fiber extends further (such as to 62.5 μm).

Fiber cutoff is measured by the standard 2 meter ("2 m") fiber cutoff test, FOTP-80 (EIA-TIA-455-80, to yield the "fiber cutoff wavelength", also known as the "2 m fiber cutoff" or "measured cutoff" The cabled cutoff (22 meter) requirement is measured using the EIA-445 Fiber Optic Test Procedures, which are part of the EIA-TIA Fiber Optics Standards; that is, the Electronics Industry Alliance-Telecommunications Industry Association Fiber Optics Standards, more commonly known as FOTPs.

Referring to FIGS. 2A and 3A, the up-doping of the outer cladding 12b with respect to the inner cladding 12a is achieved by doping the outer cladding 12b with chlorine, where the concentration of chlorine in the outer cladding 12b is greater than 2000 ppm. In some embodiments, there may be a trench region 12t between the inner and outer cladding layers as illustrated in FIGS. 2B and 3B.

Although up-doping the overclad improves bend loss performance, up-doping with chlorine makes the glass more oxidizing and promotes the formation of oxygen-rich defects in the overclad region of the fiber. Oxygen-rich defects are undesirable because they can negatively impact the fiber performance by attenuating optical signals. This application discloses the use of reducing agents during the soot-to-glass sinter step to negate or counteract the oxidizing effect associated with updoping the overclad layer with chlorine. The gaseous reducing agent is selected from the group of consisting of $CH_3Cl$, $CH_2Cl_2$, $CHCl_3$, and CO. In an embodiment of the disclosure, the reducing agent is carbon monoxide ("CO").

The disclosure can be applied to optical fibers having one or a plurality of cladding layers overlying the central core fiber. When more than one cladding layer is present in the fiber or the preform used to make the fiber, the cladding layer furthest from the core can be called either the outer cladding layer, outer clad, overclad, or overcladding layer. Any cladding layer(s) between the overcladding layer and the core is called an inner clad or inner cladding layer(s).

In some embodiments the core soot preform comprises a doped silica core surrounded by a silica adjacent-inner cladding. The core preform (and corresponding core canes made therefrom) are described as having a core/inner clad ratio, i.e., the outer radius of the core to the outer radius of the inner cladding (referred to herein as core/clad ratio or CCR, or core/edge ratio of the core cane and the same portion in the corresponding optical fibers drawn therefrom). For example, a core cane having a core/clad ratio of 1 is equivalent to the core cane being doped silica to the outer radius, and a core cane having a core/clad ratio of 0.5 is equivalent to the core cane being doped silica to 50 percent of the outer radius of the core cane, with the remainder to the outer radius being undoped silica.

The present disclosure is directed to formation of an optical fiber preform and optical fibers formed from the preform. The preform includes a core cane and one or more cladding layers that circumscribe the core cane. The preform is formed by processing a core-cladding assembly. As used herein, "core-cladding assembly", "core-cladding preform" or "core-cladding optical preform" refers to a core cane having one or more cladding layers. Processing may include dehydrating, doping and/or sintering of the core-cladding assembly. The core-cladding assembly includes a core cane and a soot cladding monolith, where the soot cladding monolith is formed independent of the core cane and includes one or more porous cladding layers. The soot cladding monolith may include an internal cavity and the core-cladding assembly may be formed by inserting the core cane into the internal cavity. Sintering consolidates the porous cladding layers of the core-cladding assembly to achieve densified cladding layers that are fused to the core cane to form the optical fiber preform.

The fiber preform formed by the present method includes two or more regions that differ in refractive index. The core cane and soot cladding monolith may each consist of one or more layers, where the different layers differ in refractive index. Fibers drawn from the preform will have core and cladding regions having refractive indices controlled by or corresponding to the different regions in the preform.

The methods and apparatus according to the present disclosure can be used to manufacture optical fiber having improved hydrogen sensitivity or aging properties. The present disclosure includes treating the optical fibers with deuterium to reduce or eliminate non-bridging oxygen defect centers so that the hydrogen sensitivity of the optical fiber is reduced. The present disclosure includes treating the cladding soot of a core-cladding assembly with a gaseous reducing agent (for example, CO) in order to reduce the deuterium treatment time required to achieve a desired reduction in the concentration of non-bridging oxygen defect centers in fibers drawn from the preform formed from the core-cladding assembly. Accordingly, the methods of the present disclosure provide improvements in the characteristics of optical fibers and/or in the rate and/or efficiency of manufacture of optical fibers.

In one embodiment, chlorine doping of the cladding soot of the core-cladding assembly is performed using a chlorine dopant precursor in the intermediate heating step of a soot-to-glass consolidation process at temperatures ranging between 1050° C. to 1300° C. Subsequently, during the sintering step of the soot-to-glass consolidation process that occurs at temperatures ranging from 1300° C. to 1550° C., no chlorine doping precursor is used and a reducing agent is instead introduced into the processing environment. That is, in the sintering step, the chlorine doping source is turned off and a reducing agent, or gas including a reducing agent, is introduced. The residual chlorine doping precursor may also be removed before or during the sintering step.

In another embodiment, the disclosure is directed to treating the cladding soot of the core-cladding assembly with a mixture of a chlorine-containing gas and a gaseous reducing agent in order to reduce the deuterium treatment time required to achieve a desired level of non-bridging oxygen defect center reduction. The gaseous reducing agent is selected from the group of consisting of $CH_3Cl$, $CH_2Cl_2$, $CHCl_3$, and CO.

In one aspect the disclosure is directed to a method using a mixture of $Cl_2$ and CO during the sintering of the core-cladding assembly to form an optical fiber preform having a core, an overclad layer and at least one inner clad layer between the core and the overclad layer. In an embodiment of the method, the CO concentration level in the gas phase of the sinter environment is greater than 1000 ppm (by volume). In another embodiment, the CO concentration level in the gas phase of the sinter environment is greater than 3000 ppm (by volume). In a further embodiment, the CO concentration level in the gas phase of the sinter environment is greater than 5000 ppm (by volume).

In some embodiments, the ratio of ppm (by volume) of CO in the sinter gas to ppm (by weight) Cl in the glass cladding is greater than 0.5. In some embodiments, the ratio of ppm (by volume) of CO in the sinter gas to ppm (by weight) Cl in the glass cladding is greater than 1. In other embodiments, the ratio of ppm (by volume) of CO in the sinter gas to ppm (by weight) Cl in the glass cladding is greater than 2.

In one aspect, the disclosure is directed to a method for improving the bend loss performance of an optical fiber, the method comprising providing a core-cladding assembly for making an optical fiber preform, where the core-cladding assembly includes a consolidated glass core cane and at least one porous glass cladding layer; sintering and chlorine up-doping the at least one porous cladding layer using a carrier gas containing a chlorine source material to form a sintered optical fiber blank, said blank having a chlorine concentration greater than 2000 ppm by weight in the outer cladding of the at least one cladding layer. In an embodiment, the sintering with the carrier gas containing the chlorine source material increases the oxygen-rich defects in the at least one chlorine doped layer and the chlorine-containing carrier gas further contains a gaseous reducing agent to decrease the oxygen-rich defects in the at least one cladding layer. In an embodiment the oxygen-rich defects in the cladding are reduced during sintering after the chlorine up-doping by the use of a gaseous mixture comprising a carrier gas and a gaseous reducing agent selected from the group consisting of $CH_4$, $CH_3Cl$, $CH_2Cl_2$, $CHCl_3$ and CO. In another embodiment, the gaseous reducing agent is CO and the carrier gas is helium. In a further embodiment, the chlorine dopant source material is used only during the pre-heat step of the soot-to-glass consolidation process at temperatures ranging between 1050° C. to 1300° C. and the reducing agent is used during the sintering step of the soot-to-glass consolidation process at temperatures at or above 1300° C., such as at temperatures ranging between 1300° C. to 1500° C. In still another embodiment, the mixture of the chlorine dopant and reducing agent is used only in the pre-heat step, at temperatures in the range of 1050° C. to 1300° C., and no chlorine dopant or reducing agent is used in the sinter step at the temperatures ranging between 1300° C. to 1550° C. When the number of cladding layers is greater than one, the last cladding layer is termed the overclad layer or outer clad layer and the layer(s) between the overclad layer and the core are termed the inner clad layers. The overclad layer may have a chlorine content of greater than 2000 ppm by weight.

In addition, in accord with an embodiment of this disclosure, the oxygen-rich defects are further decreased after sintering by the use of a carrier gas containing a component selected from the group consisting (i) a gaseous reducing agent and (ii) a mixture of a gaseous reducing agent and gaseous chlorine source; the gaseous reducing agent being selected from the group consisting of, $CH_3Cl$, $CH_2Cl_2$, $CHCl_3$ and CO. In an embodiment, the gaseous reducing agent is CO and the CO concentration in the gaseous sintering environment is greater than 1000 ppm (by volume). In another embodiment, the CO concentration in the gaseous sintering environment is greater than 3000 ppm (by volume). In a further embodiment, the CO concentration in the gaseous sintering environment is greater than 5000 ppm (by volume). Further, the ratio of ppm (by volume) CO in the sinter gas to ppm (by weight) Cl in the glass cladding is greater than 0.5. In an embodiment, the ratio of ppm (by volume) CO in the sinter gas to ppm (by weight) Cl in the glass cladding is greater than 1.0. In another embodiment, the ratio of ppm (by volume) CO in the sinter gas to ppm (by weight) Cl in the glass cladding is greater than 2.0. Additionally, in an embodiment, the volumetric ratio of CO to the chlorine precursor in the sinter gas environment is greater than 0.05. In another embodiment, the volumetric ratio of CO to the chlorine precursor in the sinter gas environment is greater than 0.1. In a further embodiment, the volumetric ratio of CO to the chlorine precursor in the sinter gas environment is greater than 0.2.

In another embodiment we propose a method of producing an optical fiber comprising: providing a porous soot cladding monolith, said soot cladding monolith including a first porous glass cladding layer and having an internal cavity;

exposing said monolith to a first gas atmosphere at a first temperature, said first gas atmosphere comprising a chlorine source material, said chlorine source material providing chlorine for doping said first porous glass cladding layer; exposing said monolith to a second gas atmosphere at a second temperature; said second gas atmosphere comprising a reducing agent; and heating said monolith in the presence of said second gas atmosphere at a third temperature; said heating causing sintering of said first porous glass cladding layer, said sintered first porous glass cladding layer having a chlorine dopant concentration of at least 500 ppm by weight.

In another embodiment, we propose a method of producing an optical fiber comprising: providing a porous soot cladding monolith, said soot cladding monolith including a first porous glass cladding layer and having an internal cavity;

exposing said monolith to a first gas atmosphere at a first temperature, said first gas atmosphere comprising a chlorine source material, said chlorine source material providing chlorine for doping said first porous glass cladding layer; exposing said monolith to a second gas atmosphere at a second temperature; said second gas atmosphere comprising a reducing agent; and heating said monolith in the presence of said second gas atmosphere at a third temperature; said heating causing sintering of said first porous glass cladding layer, said sintered first porous glass cladding layer having a chlorine dopant concentration of at least 500 ppm by weight. A core cane is then inserted into said internal cavity to form a core-cladding assembly, said core-cladding assembly including a channel between said core cane and said assembly; optionally flowing gas including chlorine-containing or fluorine-containing gas through said channel; then heating and collapsing said channel to produce a core-cladding optical fiber preform.

In another aspect, the disclosure is directed to an optical fiber made according the various embodiments of the foregoing paragraph, and the optical fiber has Time-to-Peak (TTP) hydrogen aging value at least 20% less than an optical fiber made without the use of a gaseous reducing agent. In an embodiment, the optical fiber has Time-to-Peak hydrogen aging value at least 40% less than an optical fiber made without the use of a gaseous reducing agent.

In addition, the disclosure is directed to an optical fiber having improved bend performance, said optical fiber comprising a core and at least one cladding layer, the at least one cladding layer containing greater than 2000 ppm by weight Cl in the outermost layer of said at least one cladding layer, and the optical fiber having a Time-to-Peak hydrogen aging value of less than 120 hours. In an embodiment, the at least one cladding layer of the optical fiber contains greater than 2000 ppm by weight Cl in the outermost layer of said at least one cladding layer and the optical fiber has a Time-to-Peak hydrogen aging value of less than 80 hours. In another embodiment, the at least one cladding layer of the optical fiber contains greater than 2000 ppm by weight Cl in the outermost layer of said at least one cladding layer and the optical fiber has a Time-to-Peak hydrogen aging value of less than 60 hours.

Optical fibers are routinely tested for hydrogen aging. In the hydrogen aging testing, the fibers are nominally exposed to a hydrogen-containing gas at 23° C. For purposes of this disclosure, the hydrogen-containing gas is at a total pressure of 1.0 atm and includes a partial pressure of 0.01 atm of hydrogen ($H_2$) gas and a partial pressure of 0.99 atm of nitrogen ($N_2$) gas. During the hydrogen aging test, various wavelengths of light are introduced to the fiber and monitored for changes in attenuation, referenced to the initial attenuation of a loose coil. A wavelength of interest for telecommunications applications is 1383 nm. In the hydrogen aging tests of the present disclosure, this wavelength is monitored not only for the absolute or relative change in attenuation, but also for the time of exposure of the fiber to the hydrogen-containing gas at which the attenuation increase occurs. The elapsed time from when the fiber is exposed to the hydrogen-containing gas to the time that the 1383 nm increase occurs is referred to herein as the 1383 nm "time-to-peak" (or "Time-to-Peak") value (which may be abbreviated herein as TTP). The importance of this measurement is that when exposed to hydrogen for a time as described below, reactive oxygen centers in the glass react with the hydrogen to form —OH species that absorb light at the telecommunications wavelengths, the absorbance being the greatest at about 1383 nm. The formation of absorbing —OH species upon exposure of the fiber to hydrogen gas over time is a process referred to herein as hydrogen aging. In order to prevent such aging and absorbance, which results in reduced transmission signal strength, optical fibers are treated with deuterium gas to forms —OD species from reactive oxygen centers present in the fiber. Unlike —OH, —OD does not absorb at 1383 nm.

The origin of hydrogen aging can be attributed to several phenomena. One phenomenon is the interstitial hydrogen effect, which corresponds to the absorption of light by unreacted molecular hydrogen that has diffused into the fiber. Absorption by interstitial hydrogen occurs within the optical communications window at predominately at ~1242 nm and at wavelengths in excess of ~1500 nm. This phenomenon is reversible, meaning that if the fiber is allowed to fully outgas there will be no permanent absorption.

A second phenomenon that contributes to hydrogen aging occurs when the glass is oxygen-rich. Oxygen-rich glasses contain a high concentration of defect known as "peroxyl linkages", or ≡Si—O—O—Si≡ species. Peroxyl linkages are easily cleaved by the heat and tension present during the fiber draw process. Cleavage of peroxyl linkages results in either two non-bridging oxygen hole centers ("NBOHC") (≡Si—O—O—Si≡→≡Si—O.+.O—Si≡), or an E' center and a peroxy radical (≡Si—O—O—Si≡→≡Si.+.O—O—Si≡). Any such defects that do not recombine upon cooling may react with hydrogen to form an absorbing species that attenuates an optical signal. Molecular hydrogen is present in trace quantities in the atmosphere and can also be generated over time due to evolution from coatings or cable materials, galvanic reactions between metals in cables, or oxidation. NBOHCs react with hydrogen to form ≡Si—O—H groups, which absorb at 1383 nm, according to the following reaction:

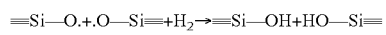

Peroxy radicals and E' centers similarly react with hydrogen to form HO—O—Si≡ and ≡Si—H groups that absorb at wavelengths longer than 1383 nm (e.g. ~1415 nm and ~1530 nm). Peroxyl linkages may be regarded as precursors to non-bridging oxygen hole centers, E' centers and peroxy radicals.

Alternatively, the glass matrix itself (for example, a glass containing Si and Ge oxides, ≡Si—O—Si≡, ≡Ge—O—Si≡ and ≡Ge—O—Ge≡) may form broken bonds during the drawing process to form E'centers, silica NBOHCs, ≡SiO., ≡Ge—O. and/or ≡Ge. defects. These defects react with hydrogen to form absorptions at various wavelengths, with the predominant effect being a broad absorption centered at ~1430 nm attributed to ≡Ge—O—H.

Optical fibers with up-doped overclad made as disclosed herein were developed to improve the bend loss performance. The up-doping of the overclad with respect to inner clad (see FIG. 2a for an example) reduces the fiber cutoff, thereby allowing for increased amount of moat volume that can be accommodated and allowing the fiber to meet the 22 meter cable cutoff requirement of 1260 nm.

The up-doping of the overclad with respect to the inner clad is achieved by doping the overclad with chlorine and it is desirable that the concentration of chlorine in the overclad glass be between 200 ppm (by weight) and 20000 ppm (by weight). The concentration of chlorine in the overclad may be greater than 500 ppm (by weight), or greater than 1000 ppm (by weight), or greater than 2000 ppm (by weight), or greater than 4000 ppm (by weight), or greater than 6000 ppm (by weight) or greater than 8000 ppm (by weight), or greater than 10000 ppm (by weight). Chlorine doping of the overclad is achieved during the soot-to-glass transformation process by using a chlorine dopant precursor, for example without limitation, chlorine gas ($Cl_2$), $SiCl_4$ and $CCl_4$, or combination thereof. The chorine dopant precursor(s) may be used alone or in combination with an inert gas. In one embodiment, the chlorine dopant precursor(s) is a component of a gas that includes helium as a predominant component.

As the increased incorporation of chlorine makes the glass more oxidizing, it can increase the magnitude of oxygen-rich defects in the overclad region of the fiber, which can negatively impact the fiber performance during the hydrogen aging test. As is disclosed herein, it is advantageous that the gas atmosphere in which the soot-to-glass sinter process is performed includes a reducing agent (such as CO). In one embodiment, the chlorine dopant precursor is used in the pre-heat step and/or intermediate heating step, and a reducing agent is used in the intermediate heating step and/or sintering step of the soot-to-glass consolidation process. In another embodiment, the chlorine dopant precursor and the reducing agent are used only in the preheat step and/or intermediate heating step, with no chlorine dopant precursor or reducing agent used in the sintering step. In yet another embodiment, no chlorine dopant precursor or reducing agent is used in the pre-heat step and both chlorine dopant precursor and reducing agent are used in the intermediate heating and/or sinter step of the soot-to-glass consolidation process.

Figure 5:
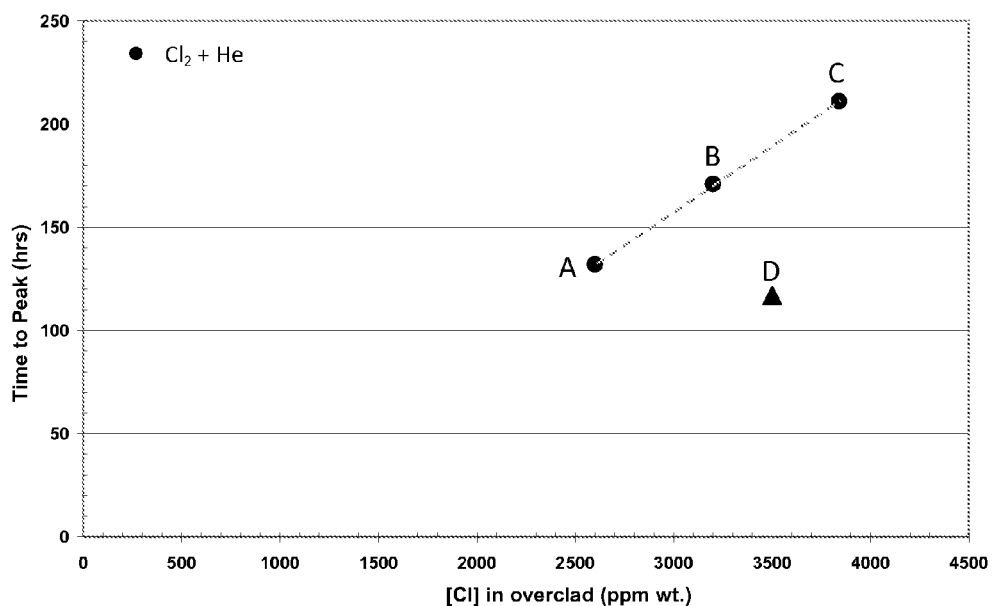
FIG. 5 is a graph illustrating the effect on Time-to-Peak ("TTP") at 1383 nm for optical fibers exposed to hydrogen, 1% $H_2$ by volume in $N_2$, for glass samples consolidated in a $He/Cl_2$ atmospheres containing different concentrations of $Cl_2$ in He ("●") and a $He/Cl_2+CO$ ("▲") atmosphere containing the highest $Cl_2$ concentration used in the $He/Cl_2$ determination of TTP.

The increase in the oxygen-rich defect concentration is shown in FIG. 5, where an increase in Time-to-Peak (TTP) for elevated attenuation is seen to increase with overclad chlorine concentration (due to increased formation of oxygen-rich defects) when the fiber is exposed to a hydrogen aging test gas containing 1% hydrogen and 99% $N_2$ at 23° C. As indicated above, TTP can be decreased by incorporating a gaseous reducing agent in the chlorine-containing sinter gas because the reducing agent counteracts the oxidizing effects of chlorine. In FIG. 5, TTP was determined for glass samples "●" labeled A, B and C that were consolidated in atmosphere containing 10 Vol. %, 25 Vol. % and 35 Vol. % $Cl_2$ in He, respectively; and the glass sample D indicated by symbol ▲ was consolidated in an atmosphere containing 35 Vol. % $Cl_2$ and 0.3 Vol. % CO in He. Sample C had the highest oxygen-rich defect value as shown by the greater than 200 hour TTP value. The use of reducing agents, for example CO, during the soot-to-glass sinter step was found to negate the oxidizing effect of higher chlorine concentration in the overclad layer. As indicated by the results shown in FIG. 5, the use of 3000 ppm (0.3 Vol. %) CO and 35 Vol. % $Cl_2$ during the sintering of an overclad glass resulted in a glass, glass D, having 3500 ppm chlorine with a TTP value that has been decreased by approximately about 40% relative to the same glass sintered using 35 Vol. % $Cl_2$ in He, but without CO (glass C).

In one embodiment, the optical fiber includes a core and at least one cladding layer, where the at least one cladding layer includes a chlorine dopant concentration of at least 500 ppm by weight or at least 1000 ppm by weight, or at least 2000 ppm by weight, or at least 4000 ppm by weight, or at least 6000 ppm by weight, or at least 8000 ppm by weight, or at least 10000 ppm by weight, and the optical fiber has a time-to-peak (TTP) hydrogen aging value at 23° C. of less than 100 hours, or less than 80 hours, or less than 60 hours, or less than 40 hours, or less than 20 hours upon exposure to a gas atmosphere having a total pressure of 1 atm and containing a partial pressure of 0.01 atm $H_2$ and a partial pressure of 0.99 atm $N_2$.

In one embodiment, the optical fiber includes a core and at least one cladding layer, where the at least one cladding layer includes a chlorine dopant concentration of at least 500 ppm by weight or at least 1000 ppm by weight, or at least 2000 ppm by weight, or at least 4000 ppm by weight, or at least 6000 ppm by weight, or at least 8000 ppm by weight, or at least 10000 ppm by weight, the optical fiber contains less than 1 ppb by weight of OD groups and the optical fiber has a time-to-peak (TTP) hydrogen aging value at 23° C. of less than 100 hours, or less than 80 hours, or less than 60 hours, or less than 40 hours, or less than 20 hours upon exposure to a gas atmosphere having a total pressure of 1 atm and containing a partial pressure of 0.01 atm $H_2$ and a partial pressure of 0.99 atm $N_2$.

In one embodiment, the optical fiber has a time-to-peak (TTP) hydrogen aging value upon exposure to a gas atmosphere containing 1% $H_2$ and 99% $N_2$ at 23° C. that is at least 20% less than, or at least 40% less than, or at least 60% less than the corresponding TTP of a fiber having a sintered porous cladding layer with a chlorine dopant concentration of at least 500 ppm by weight, or at least 1000 ppm by weight, or at least 2000 ppm by weight, or at least 4000 ppm by weight, or at least 6000 ppm by weight, or at least 8000 ppm by weight, or at least 10000 ppm by weight that was drawn from a preform that was not heated in the presence of the reducing agent.

The CO concentration level is preferably higher than 1000 ppm (by volume) in the intermediate heating step and/or sintering step of the soot-to-glass processing environment, in some embodiments higher than 3000 ppm (by volume), in some embodiments higher than 5000 ppm (by volume), and in some embodiments the CO concentration is between 1000 to 10,000 ppm (by volume). In an embodiment, the ratio of ppm (by volume) CO in the intermediate heating step and/or sintering step of the soot-to-glass processing environment to ppm (by weight) Cl in the glass overclad is greater than 0.5. In other embodiments, ratio of ppm (by volume) CO in the intermediate heating step and/or sintering step of the sootto-glass processing environment to ppm (by weight) Cl in the glass overclad is greater than 1. In another embodiment, the ratio of ppm (by volume) CO in the pre-heat step and/or sintering step of the soot-to-glass processing environment to ppm (by weight) Cl in the glass overclad is greater than 2.

In an embodiment, the reducing agent treatment is done for an overclad layer that has greater than 2000 ppm (by weight) chlorine. In an embodiment, the reducing agent treatment is done for an overclad layer that has greater than 4000 ppm (by weight) chlorine. In a further embodiment, the reducing agent treatment is done for an overclad layer that has greater than 6000 ppm (by weight) chlorine. In another embodiment, the reducing agent treatment is done for an overclad layer that has greater than 8000 ppm (by weight) chlorine. In still another embodiment, the reducing agent treatment is done for an overclad layer that has greater than 10000 ppm (by weight) chlorine.

The methods and apparatus according to the present disclosure may be used to manufacture optical fiber having desirable or improved hydrogen sensitivity or aging properties. The present disclosure includes forming an optical fiber preform with a process in which a reducing agent is included in the intermediate heating stage and/or sintering step of the soot-to-glass process, drawing optical fibers from the preform, and optionally treating the optical fibers with deuterium to reduce or eliminate non-bridging oxygen defect centers so that the hydrogen sensitivity of the optical fiber (sensitivity of the optical fiber to hydrogen aging) is reduced. The present disclosure further includes treating the cladding soot of a soot preform from which the optical fiber will be formed with a mixture of a reducing agent (e.g. CO) in order to reduce the deuterium treatment time required to achieve a desired level of non-bridging oxygen defect center reduction. Accordingly, the methods of the present disclosure may provide improvements in the characteristics of optical fibers and/or in the rate and/or efficiency of manufacture of optical fibers.

Figure 6:
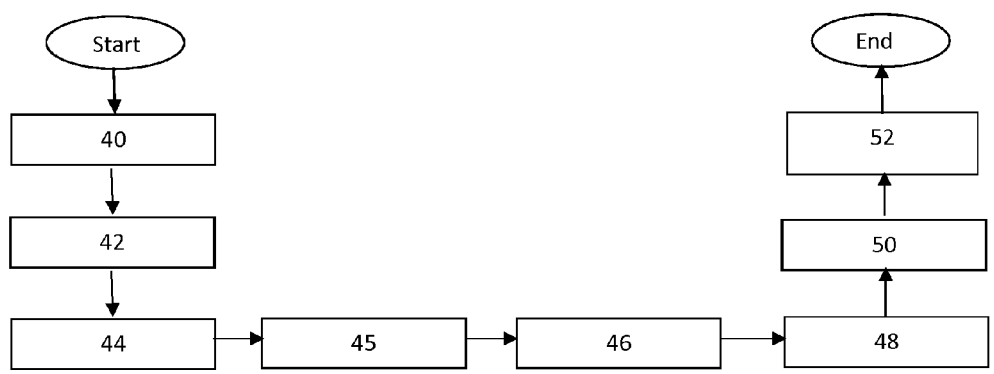
FIG. 6 is a flow chart illustrating a procedure for manufacturing optical fiber in accordance with the present disclosure from forming the core soot preform to deuterium treatment of drawn optical fiber.

FIG. 6 is a flow chart illustrating an exemplary method for manufacturing optical fiber and, in accordance with the present disclosure, illustrates the provision of an optical fiber preform that has been treated with a reducing gas and consolidated, drawing the glass blank (consolidated optical fiber preform) to form an optical fiber, and treating the drawn fiber with deuterium. In FIG. 6, the method comprises:

at block 40, providing a mandrel or substrate and depositing a silica-containing core soot on the substrate to form a porous core soot preform. In some embodiments, the porous core soot preform includes a doped silica core surrounded by a silica adjacent-inner cladding;

at block 42, removing the mandrel, consolidating (including sintering) the porous core soot preform, and drawing the consolidated core soot preform to form a core cane;

at block 44, forming a soot cladding monolith independent of the core cane, where the core cane includes one or more porous soot cladding layers and an internal cavity;

at block 45, inserting the core cane into the internal cavity of the soot cladding monolith to form a core-cladding assembly;

at block 46, chlorine doping the at least one of the at least one porous soot cladding layers using a chlorine source material, and optionally a carrier gas admixed with the chlorine source material;

at block 48, ceasing the chlorine doping and consolidating (including sintering) the at least one porous cladding layer in the presence of a gas to form an optical fiber preform having an outer clad with a chlorine concentration greater than 500 ppm by weight, wherein the gas in the chlorine doping and/or sintering step contains a gaseous reducing agent to decrease the oxygen-rich defects in the sintered at least one cladding layer;

at block 50, drawing the consolidated optical fiber preform into an optical fiber; and at block 52, treating the drawn optical fiber in a deuterium-containing atmosphere to further reduce any remaining oxygen-rich defects in the fiber and convert —OH sites in the fiber to —OD sites.

Figure 7:
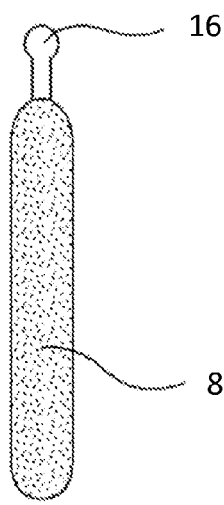
FIG. 7 is a frontal view of a core soot preform formed using a method according to embodiments of the present invention.

At block 40, a core soot preform is formed. FIG. 7 shows exemplary core soot preform 8 with handle 16. The core soot preform 8 may be formed using any suitable method, such as chemical vapor deposition (CVD) (e.g., outside vapor deposition (OVD), vapor axial deposition (VAD), modified chemical vapor deposition (MCVD), plasma chemical vapor deposition (PCVD)) or any other suitable technique such as sol-gel processing or flame hydrolysis. The core soot preform 8 may be formed from pure silica or doped silica (for example, silica doped with a suitable dopant or dopants including, but not limited to, germania, boron, fluorine, aluminum, titanium, phosphorous, and/or chlorine). Doping may be used to control the refractive index of the core soot preform. The refractive index profile of the core cane may be a constant profile, a step index profile, or a monotonically varying profile (e.g. α-profile or super Gaussian profile). The core soot preform may be formed as a single layer or multilayer body, where the one or more layers may be doped, undoped and if doped, the one or more layers may include differences in the type, concentration, or distribution of dopants. The core soot preform 8 is a porous structure defining a plurality of interstices. The core soot preform 8 may include a passage extending the full length thereof from which a mandrel of the deposition apparatus has been removed. According to some embodiments, the core soot preform 8 has a density of no greater than about 1.0 g/cc, preferably of no more than about 0.7 g/cc, and more preferably of no more than about 0.6 g/cc.

At block 42 of FIG. 6, the core soot preform 8 is consolidated to form a consolidated core glass preform and the consolidated core glass preform is drawn to form a core cane. The consolidation of the core soot preform 8 includes sintering and may include other process steps such as drying and/or doping. The consolidation of the core soot preform 8 may employ any suitable or desired processes or parameters consistent with the methods described herein. Suitable apparatus for consolidating the core soot preform 8 and drawing the consolidated core soot preform are known to those of skill in the art.

The core soot preform 8 may or may not be treated with a reducing agent during consolidation. In one embodiment, the core soot preform 8 is treated with a reducing agent before or during consolidation, but such treatment is at level and under conditions insufficient to increase the baseline attenuation of the fiber ultimately drawn from the consolidated core preform by more than 1.5% at a wavelength of 1550 nm relative to fiber not treated with a reducing agent during consolidation but otherwise formed in the exact same manner as the fiber formed by the present methods.

At block 44 of FIG. 6, the soot cladding monolith is formed independent of the core cane. By forming the soot cladding monolith independent of the core cane, the core cane is not exposed to byproducts (such as water) that may be produced in the deposition or post-deposition processing of the soot cladding. This prevents rewetting of the core cane and leads to a reduction in hydroxyl content of the fiber preform and in fibers drawn from the preform. As a result, attenuation at 1380 nm due to hydroxyl absorption is greatly reduced.

The soot cladding monolith may be formed by depositing one or more layers of silica soot or doped silica soot on a substrate and removing the substrate to provide the soot cladding monolith. The substrate may be a bait rod. The cladding soot (or layers thereof) may be formed of pure silica or may be formed of doped silica (for example, silica doped with a suitable dopant or dopants including, but not limited to, germania, boron, fluorine, aluminum, titanium, phosphorous, and/or chlorine). As indicated hereinabove, the cladding soot may include multiple layers that differ in doping and refractive index to provide fiber index profiles such as those shown in FIGS. 3A and 3B. In the following discussion, fabrication of a soot cladding monolith having three porous soot cladding layers is described. It is recognized, however, that the procedure outlined is generally applicable to a soot cladding monolith having any number of porous soot cladding layers.

Figure 8:
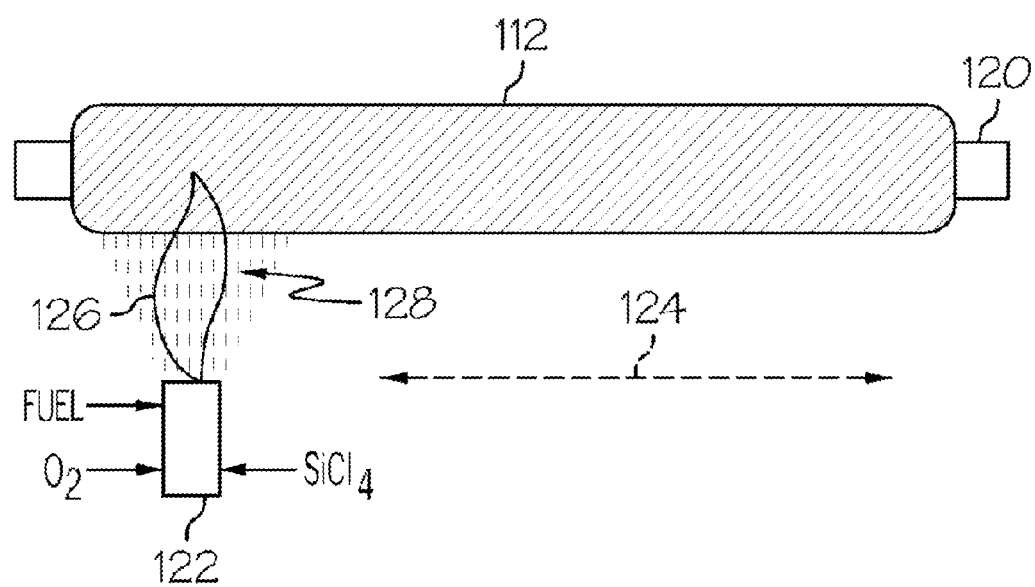
FIG. 8 depicts deposition of a soot layer on a bait rod.

FIG. 8 illustrates deposition of a silica-based soot layer 112 on bait rod 120. The silica-based glass soot is formed by providing a vapor phase silica-based glass precursor material, such as $SiCl_4$ or octamethylcyclotetrasiloxane (OM-CTS), to a burner 122. The gas-fed burner 122 is supplied with fuel, such as $H_2$, $CH_4$, $D_2$ (deuterium), $CD_4$ or CO. Oxygen is also provided to burner 122 and the fuel and oxygen are combusted to create flame 126. In some embodiments, the vapor phase silica-based glass precursor material is $SiCl_4$ and the gas-fed burner 122 is supplied with a non-hydrogenated fuel such as $D_2$, $CD_4$ or CO in order to limit the amount of residual OH in the deposited silica-based glass soot. The vapor phase silica-based glass precursor material may be delivered to the burner at a flow rate from about 4 L/min to about 10 L/min, while the fuel may be supplied to the burner at a flow rate from about 10 L/min to about 40 L/min.

The vapor phase silica-based glass precursor material is reacted in the flame 126 to produce silica-based glass soot 128, which is deposited as soot layer 112 on bait rod 120 as the bait rod is rotated. The rotation rate may be from about 50 rpm to about 400 rpm. Soot layer 112 may have the same, higher, or lower refractive index than undoped silica. Higher or lower refractive indices may be achieved by supplying an updopant or downdopant precursor to burner 122. Soot layer 112 may constitute a single-layer soot cladding monolith or may constitute the innermost (smallest radius) layer of a multilayer soot cladding monolith. The flame 126 of the gas-fed burner 122 is traversed back and forth along the axial length of the bait rod 120 as indicated by arrow 124 as the bait rod is rotated thereby building up silica-based glass soot and forming soot layer 112 on the bait rod 120.

Figure 9:
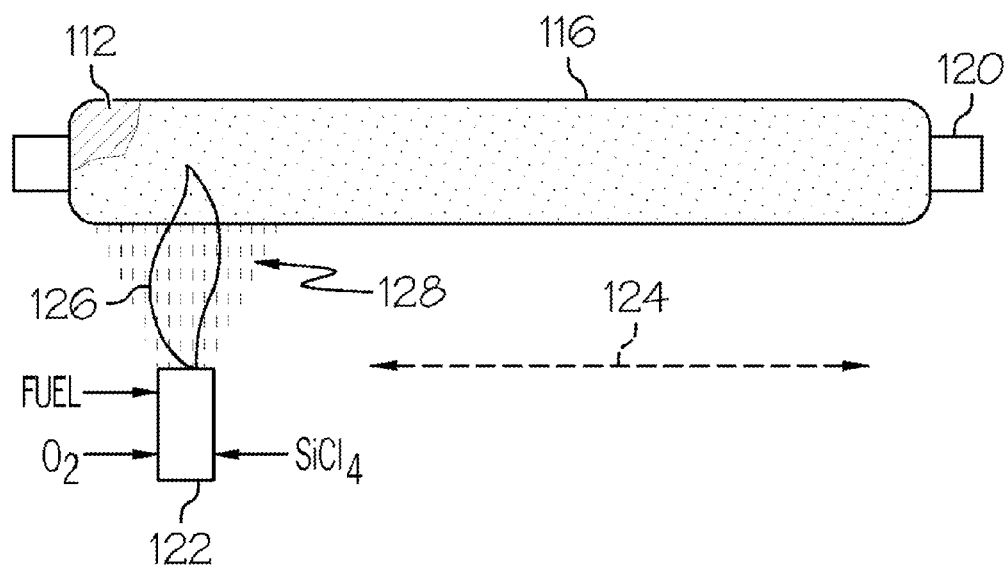
FIG. 9 depicts deposition of a second soot layer on the soot layer shown in FIG. 8.

FIG. 9 depicts deposition of soot layer 116 on soot layer 112. Soot layer 116 may be formed in a similar manner as soot layer 112. For example, a vapor phase silica-based glass precursor material, such as $SiCl_4$ or OMCTS, may be supplied to the gas-fed burner 122 and reacted in the flame 126 to form silica-based glass soot which is deposited as soot layer 116 on soot layer 112 as the bait rod is rotated. Soot layer 116 may have the same, higher, or lower refractive index than soot layer 112. To achieve a preform that enables drawing of a fiber with the two-layer cladding region of FIG. 3A, for example, soot layer 112 may be undoped silica and soot layer 116 may be updoped silica. Soot layer 116 may constitute an outer layer of a two-layer soot cladding monolith or an intermediate layer of a soot cladding monolith having three or more layers.

Figure 10:
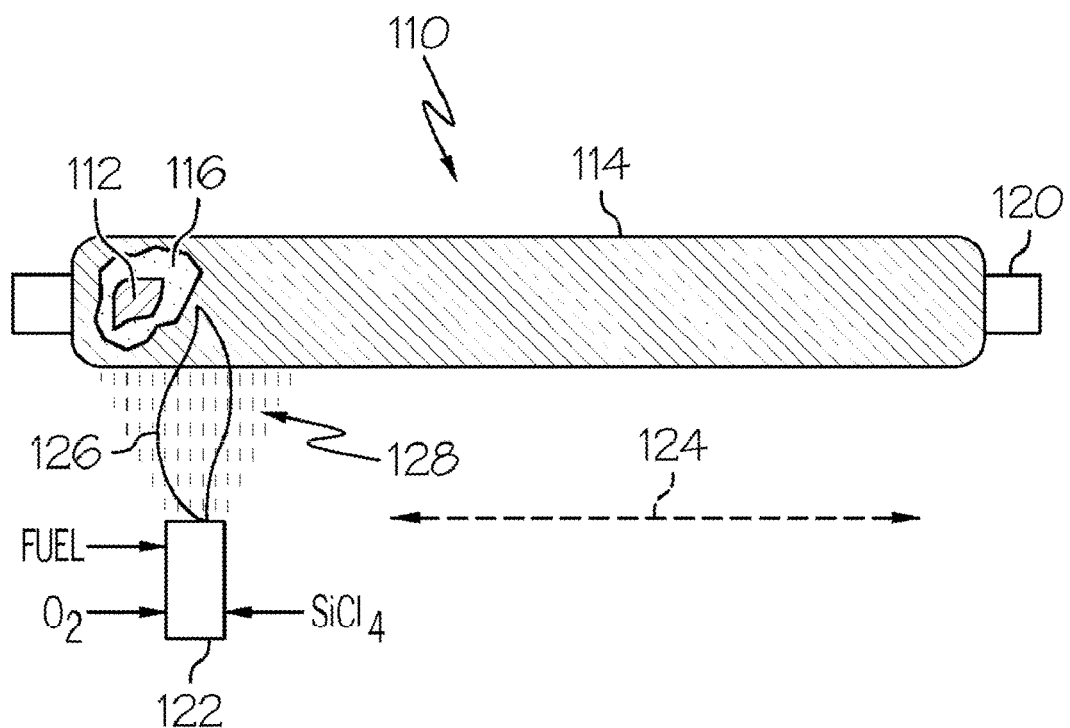
FIG. 10 depicts deposition of a third soot layer on the soot layer shown in FIG. 9.

FIG. 10 depicts deposition of soot layer 114 on soot layer 116. Soot layer 114 may be formed in a similar manner as soot layer 112 or soot layer 116. For example, a vapor phase silica-based glass precursor material, such as $SiCl_4$ or OMCTS, may be supplied to the gas-fed burner 122 and reacted in the flame 126 to form silica-based glass soot which is deposited as soot layer 114 on soot layer 116 as the bait rod is rotated. Soot layer 114 may have the same, higher, or lower refractive index than soot layer 116 or soot layer 112. To achieve a preform that enables drawing of a fiber with the three-layer cladding region of FIG. 3B, for example, soot layer 112 may be undoped silica, soot layer 116 may be downdoped silica, and soot layer 114 may be updoped silica. Soot layer 114 may constitute an outer layer of a three-layer soot cladding monolith or an intermediate layer of a soot cladding monolith having four or more layers. Additional layers of may be deposited similarly to obtain a soot cladding monolith having any desired number of layers.

Process conditions used to form the different layers of a multilayer soot cladding monolith may be the same or different. Process variables include flame temperature, flow rates of precursors for silicon or dopants, traversal rate of the burner along the length of the bait substrate, and rotation rate of the bait substrate. Variations in process conditions can control the deposition rate of soot and density of soot in the as-deposited state. The flame temperature may be 1500° C. or higher. Higher flame temperatures promote higher as-deposited soot density. Conversely, lower flame temperatures lower as-deposited soot density.

Soot density may also be influenced by the rate of traversal of the burner along the bait substrate. The traversal rate of the flame may be greater than 0.1 cm/sec, or greater than 0.25 cm/s or greater than 0.5 cm/s, or greater than 1 cm/s, or greater than 2 cm/s, or greater than 3 cm/s. Faster traversal rates may lead to less dense, more porous soot layers in the as-deposited state. Conversely, slower traversal rates may lead to denser, less porous soot layers in the as-deposited state. The density of the as-deposited soot layer may be less than 1.0 $g/cm^3$, or less than 0.8 $g/cm^3$, or less than 0.6 $g/cm^3$, or less than 0.5 $g/cm^3$. The density of the as-deposited soot layer may be greater than 1.0 $g/cm^3$, or greater than 1.25 $g/cm^3$, or greater than 1.5 $g/cm^3$, or greater than 1.75 $g/cm^3$ or greater than 2.0 $g/cm^3$.

The density of the as-deposited soot layer may also be influenced by the delivery rate of the soot precursor to the burner. The flow rate of silica-based soot precursors may be in the range from 0.1 L/min to 20 L/min. Lower flow rates promote the formation of soot layers having higher density in the as-deposited state. Conversely, higher flow rates promote the formation of soot layers having lower density in the as-deposited state.

The density of the as-deposited soot layer may also be influenced by the rate of rotation of the bait rod during soot deposition. Decreasing the rate of rotation of the bait rod may assist in increasing the density of the as-deposited soot layer. Conversely, increasing the rate of rotation of the bait rod may assist in decreasing the density of the as-deposited soot layer.

In one embodiment, the soot cladding monolith includes two soot layers, where the outer layer has a higher density than the inner layer. In another embodiment, the soot cladding monolith includes three soot layers, where an intermediate soot layer is positioned between an inner soot layer and outer soot layer and where the intermediate soot layer has a higher density than the inner soot layer. In still another embodiment, the soot cladding monolith includes four or more soot layers, where two or more intermediate soot layers are positioned between an inner soot layer and outer soot layer and where at least one of the intermediate soot layers has a higher density than the inner soot layer.

Inclusion of a high density soot layer in the soot cladding monolith may facilitate selective doping of the inner layer of the soot cladding monolith by providing a barrier layer that prevents diffusion of the dopant to outer layers of the soot cladding monolith. In some embodiments, this barrier layer (i.e. a radial (circumferential) layer along the length of the monolith) is ≥1 µm in radial thickness. A densified or partially densified interior layer within the soot cladding monolith may act as a diffusion barrier to prevent transfer of doping elements in either direction from one side of the densified interior layer to the other side of side of the densified interior layer. In one embodiment, a diffusion barrier may include a soot or glass layer having a density of at least 1.5 g/cm$^3$, or at least 1.75 g/cm$^3$, or at least 2.0 g/cm$^3$.

Once the desired number and type of soot cladding layers has been deposited, the bait rod is removed to provide a soot cladding monolith. The space occupied by the bait rod forms an internal cavity of the soot cladding monolith.

At block 45 of FIG. 6, the core cane is inserted in the internal cavity of the soot cladding monolith to form a core-cladding assembly.

Figure 11:
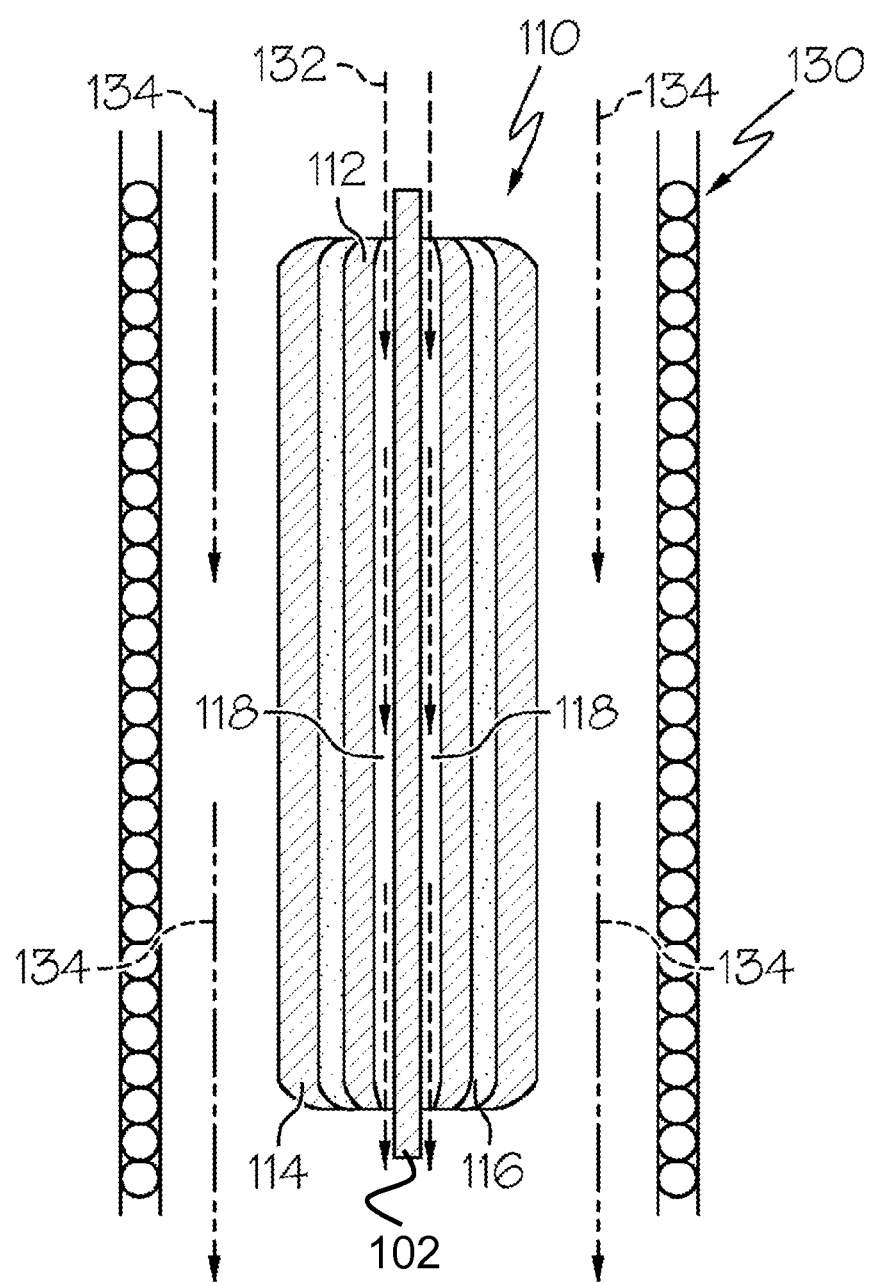
FIG. 11 depicts processing of a core-cladding assembly that includes a consolidated core cane inserted into an internal cavity of a three-layer soot cladding monolith.

FIG. 11 shows placement of soot cladding monolith 110 in consolidation furnace 130. Soot cladding monolith 110 corresponds to the three-layer soot structure shown in FIG. 10 after removal of bait rod 120 and includes a series of concentric soot layers 112, 116, and 114 as described above. Soot cladding monolith 110 further includes internal cavity 118. In the embodiment of FIG. 11, internal cavity 118 extends through the entire length of soot cladding monolith 110. In other embodiments, internal cavity 118 extends only partially into soot cladding 110. Densified core cane 102 is inserted into internal cavity 118 to form a core-cladding assembly. The core-cladding assembly includes a gap between the outer surface of core cane 102 and the inner surface of soot cladding layer 112. The core-cladding assembly is processed in consolidation furnace 130.

At blocks 46 and 48 of FIG. 6, the core-cladding assembly is processed in accordance with the methods described herein to form an optical fiber preform. As noted hereinabove, the processing includes consolidation and effects a soot-to-glass transformation of the one or more porous soot cladding layers of the core-cladding assembly. Processing may include a pre-heat step, an intermediate heating step, and a sintering step, where one or more of the pre-heat step, intermediate heating step, and sintering step may include treatment of the soot cladding preform with a reducing agent. Processing of the soot cladding preform may also include a drying step and a doping step.

In embodiments in which processing includes a drying step, the core-cladding assembly is treated with a drying agent. The drying step may be performed at a temperature of between about 800° C. and 1300° C., including in one or both of the pre-heating step and intermediate heating step described hereinabove. The drying agent penetrates the pores of the porous soot cladding layers of the core-cladding assembly and reacts with water or OH groups to remove water and OH groups from the porous soot cladding layers. The drying agent may also remove transition metals or other impurities that may be present in the porous soot cladding layers.

Referring to FIG. 11, the drying agent may enter the gap between the outer surface of core cane 102 and the inner surface of soot cladding layer 112 as indicated by flow path 132. The drying agent may also enter pores within soot layers 112, 116, and 114, and may also surround or pass around the outer surface of soot cladding layer 114 as indicated by flow path 134. The flow rate of the drying agent through and/or around the core-cladding assembly may be in the range from about 1 L/min to about 40 L/min. The core-cladding assembly may be heated during dehydration. Heating may further the action of the drying agent and may promote removal of hydroxyl and water.

The temperature of dehydration may be in the range from about 500° C. to about 900° C. and the time of dehydration may be in the range from 30 min to 10 hours. The temperature of dehydration is preferably less than the temperature needed to initiate sintering of the soot cladding monolith component of the core-cladding assembly. Premature sintering of the soot cladding monolith closes pores and blocks access of the dehydration agent to the interior of the soot cladding monolith and thus inhibits removal of hydroxyl and water. The drying agent may be removed from the environment surrounding the soot cladding monolith and/or core-cladding assembly upon conclusion of dehydration.

Suitable drying agents include chlorine-containing gases such as $Cl_2$, $SiCl_4$, $GeCl_4$, $SOCl_2$, and/or $POCl_3$. The drying agent may optionally be diluted in an inert gas such as He, Ar, Ne and/or $N_2$. In one embodiment, the dehydration gas comprises a mixture of 2% to 6% chlorine gas in helium gas. In some embodiments, the drying gas contains less than about 5 volume % chlorine, such as between about 0.01 and 3.0 volume % chlorine.

In some embodiments, processing may include a doping step, such as a chlorine doping step in which the core-cladding assembly is exposed to a chlorine dopant precursor. The chlorine dopant precursor is a chlorine-containing gas and may be comprised of chlorine ($Cl_2$), $SiCl_4$, $CCl_4$, or mixtures thereof. The chlorine dopant precursor may include a combination of a chlorine-containing gas and an inert gas. In one embodiment, the chlorine doping is performed during the pre-heat step of the soot-to-glass transformation process. In another embodiment, the chlorine doping is performed during the intermediate heating step. In still another embodiment, the chlorine doping is performed during the sintering step of the soot-to-glass transformation process. Doping preferably occurs while the cladding layers of the core-cladding assembly are sufficiently porous to permit diffusion or penetration of a dopant or doping precursor. In one embodiment, doping occurs after dehydration and before sintering.

In one embodiment, doping is accomplished by supplying a doping precursor to a flow pathway between the outer surface of the core cane and inner layer of the soot cladding monolith in the core-cladding assembly. For example, a doping precursor may be supplied to flow pathway 132 shown in FIG. 11. In another embodiment, doping is accomplished by supplying a doping precursor to a flow pathway adjacent to the outer surface of the outer soot layer of the soot cladding monolith component of the core-cladding assembly. For example, a doping precursor may be supplied to flow pathway 134 shown in FIG. 11.

When a doping precursor is supplied to porous soot layers of the soot cladding monolith component of the core-cladding assembly, it may enter the pores and deliver a dopant to the surface and/or throughout the interior of the soot layer. Doping may occur in multiple layers of the soot cladding monolith portion of the core-cladding assembly. As indicated hereinabove, soot cladding monolith may include a high density internal soot layer that acts as a diffusion barrier to prevent transfer, or block access, of the doping precursor or dopant to soot layers on the side of the diffusion barrier opposite the side in closest proximity to the point of introduction of the doping precursor. In some embodiments, this barrier layer (i.e. a radial (circumferential) layer along the length of the monolith) is ≥1 µm in radial thickness. In the embodiment of FIG. 11, for example, soot layer 116 may be configured as a high density barrier layer that prevents transfer of dopants or doping precursors from soot layer 112 to soot layer 114 or from soot layer 114 to soot layer 112. In one embodiment, a doping precursor supplied to flow pathway 132 provides a dopant to soot layer 112 and soot layer 116 has been densified to function as a barrier layer to prevent diffusion, migration, or other transfer of the doping precursor or dopant supplied by the doping precursor from soot layer 112 to soot layer 114. In an alternative embodiment, a doping precursor supplied to flow pathway 134 provides a dopant to soot layer 114 and soot layer 116 has been densified to function as a barrier layer to prevent diffusion, migration, or other transfer of the doping precursor or dopant supplied by the doping precursor from soot layer 114 to soot layer 112.

In various embodiments, the chlorine doping level in the consolidated cladding layer(s) is in the range of greater than 200 ppm by weight and less than 20,000 ppm by weight. In one embodiment, the chlorine doping level in the consolidated cladding layer(s) is in the range of 200 ppm by weight to 20,000 ppm by weight. In an embodiment, the chlorine doping level in the consolidated cladding layer(s) is greater than 500 ppm by weight. In another embodiment, the chlorine doping level in the consolidated cladding layer(s) is greater than 2000 ppm by weight. In a further embodiment the chlorine doping level in the consolidated cladding layer(s) is greater than 4000 ppm by weight. In an additional embodiment, the chlorine doping level in the consolidated cladding layer(s) is greater than 6000 ppm by weight. In further embodiments, the cladding includes two or more consolidated layers where only the overclad layer is doped with chlorine at any of the doping levels specified herein.

The reducing agent used to treat the core-cladding assembly may be selected from the group consisting of $CH_3Cl$, $CH_2Cl_2$, $CHCl_3$, CO, and combinations thereof. The reducing agent may be supplied neat or in combination with one or more other gases. The one or more other gases may include other reducing agent-containing gases and/or inert gases. According to some embodiments, the cladding soot is exposed to a reducing agent-containing gas that includes at least 0.1 volume % CO, or between 0.1 volume % CO and 1.0 volume % CO, or between 0.4 and 0.6 volume % CO. The balance of the reducing agent-containing gas may be an inert gas (e.g. $N_2$, Ar, Ne, He) or a combination of an inert gas with $Cl_2$, or $Cl_2$. The concentration of $Cl_2$ in the reducing agent-containing gas may be less than about 2 volume % or between about 1 volume % and 2 volume %.

The reducing agent may be supplied to flow pathway 132 and/or flow pathway 134 shown in FIG. 11. The reducing agent may be supplied to the core-cladding assembly before initiation of sintering, during the sintering process and/or after conclusion of the sintering process. Exposure of the core-cladding assembly to the reducing agent may occur after dehydration. The core-cladding assembly may be heated during exposure to the reducing agent. The temperature of the core-cladding assembly during exposure to the reducing agent may be sufficient to initiate sintering of the core-cladding assembly.

According to some embodiments, the cladding soot is exposed to the reducing agent during the soot-to-glass transformation for a treatment time of between about 2 and 10 hours and at a temperature of between about 800° C. and 1500° C., or a temperature of between about 1100° C. and 1500° C. or a temperature of between about 1300° C. and 1500° C.

The concentration of reducing agent in the reducing agent-containing gas, the temperature of treatment of the core-cladding assembly with the reducing agent-containing gas, and the time of treatment of the core-cladding assembly with the reducing agent-containing gas are selected to provide a selected level of oxidation state reduction to the cladding soot 12a,12b depending on the level of chlorine doping level of the cladding soot. According to some embodiments, the temperature of treatment of the soot cladding with the reducing agent-containing gas is at least about 800° C. According to some embodiments, the temperature of treatment of the soot cladding with the reducing agent-containing gas is between about 800° C. and 1500° C. The treatment temperature may be constant or varied. According to some embodiments, the time of treatment of the soot cladding with the reducing agent-containing gas is between about 120 and 600 minutes. According to some embodiments, the time of treatment of the soot cladding with the reducing agent-containing gas is between about 120 and 240 minutes. According to some embodiments, the reducing agent-containing gas is provided to the soot cladding at a flow rate of between about 0.002 and 0.2 slpm (standard liters per minute).

In one embodiment, the treatment of core-cladding assembly with a reducing agent and the sintering step overlap so that the soot cladding layer(s) of the core-cladding assembly is(are) exposed to the reducing agent during the sintering step. The introduction of the reducing agent-containing gas may be initiated prior to, after, or substantially simultaneously with the beginning of the sintering step. Two or more cycles of treatment of the core-cladding assembly with the reducing-agent containing gas may be executed at any point during the soot-to-glass consolidation process. According to some embodiments, the reducing agent-containing gas is present in the treatment chamber for at least 50% of the duration of the sintering step. According to some embodiments, the reducing agent-containing gas is present in the treatment chamber throughout the entirety of the sintering step. According to some embodiments, the treatment of the core-cladding assembly with the reducing agent-containing gas is performed in a single treatment cycle that is substantially coextensive with the sintering step of the soot-to-glass consolidation process. According to certain preferred embodiments, the soot cladding is only exposed to the reducing agent-containing treatment gas during the sintering step. According to some embodiments, no chlorine-containing gas is flowed into the treatment chamber during or following the reducing agent-containing gas treatment step(s).

Sintering of the core-cladding assembly may occur after dehydration and may occur after treatment of the core-cladding assembly with a reducing agent. The sintering may be concurrent with treatment of the core-cladding assembly with a reducing agent. The drying agent and/or dopant precursor may be removed from the ambient of the core-cladding assembly before initiation of sintering.

The sintering may consolidate the soot cladding monolith and fuse the soot cladding monolith with the core cane to form a consolidated fiber preform. During sintering, densification occurs as the pores of the soot cladding monolith collapse and the soot cladding monolith collapses and adheres to the core cane. The sintering temperature may be at least 1000° C., or at least 1150° C., or at least 1250° C., or at least 1300° C., or at least 1400° C. Higher sintering temperatures reduce the time of sintering.

Figure 12:
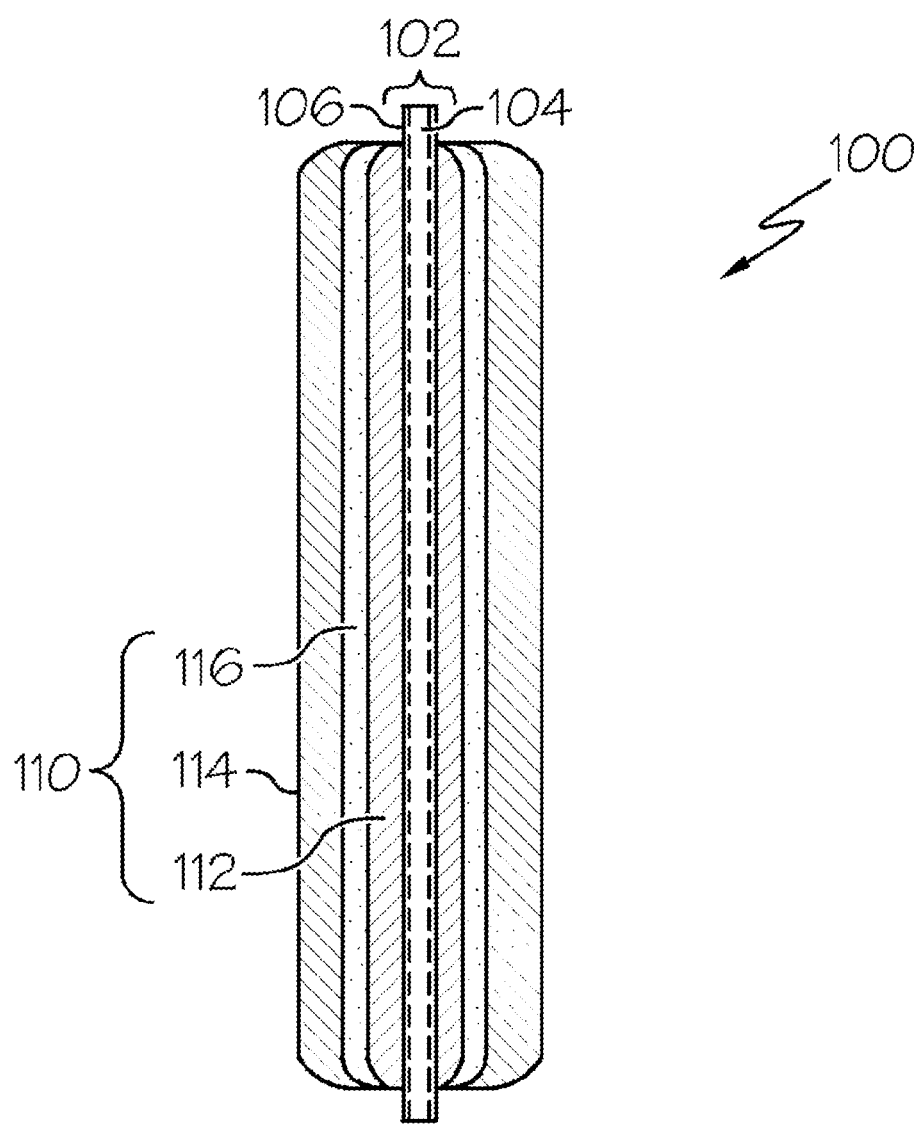
FIG. 12 depicts a fiber preform formed from the core-cladding assembly shown in FIG. 11.

Sintering may be accomplished in a consolidation furnace by forming a hot zone of sufficient temperature to induce sintering within the consolidation furnace and advancing the core-cladding assembly through the hot zone. In one embodiment, the hot zone has a temperature from about 1400° C. to about 1500° C. and the core-cladding assembly is advanced through the hot zone at a rate of about 5 mm/min to 50 mm/min. Sintering the core-cladding assembly produces an optical fiber preform. FIG. 12 shows optical fiber preform 100 formed by sintering the core-cladding assembly of FIG. 11. The optical fiber preform is a solid piece of glass with a central core with one or more concentric regions surrounded by one or more concentric cladding regions.

In one embodiment, sintering occurs in the absence of $Cl_2$. In a second embodiment, sintering occurs in the absence of a chlorine-containing gas. In a third embodiment, sintering of the core-cladding assembly occurs in the presence of a reducing agent. In a fourth embodiment, sintering of the core-cladding assembly occurs in the presence of a reducing agent and in the absence of $Cl_2$. In a fifth embodiment, sintering of the core-cladding assembly occurs in the presence of a reducing agent and in the absence of a chlorine-containing gas.

The method of producing an optical fiber may include providing a core-cladding assembly having a consolidated glass core and at least one porous glass cladding layer; exposing the core-cladding assembly to a first gas atmosphere at a first temperature where the first gas atmosphere includes a chlorine source material and the chlorine source material provides chlorine for doping the at least one porous glass cladding layer; exposing the core-cladding assembly to a second gas atmosphere at a second temperature where the second gas atmosphere includes a reducing agent; and heating the core-cladding assembly in the presence of the second gas atmosphere at a third temperature where the heating causes sintering of the at least one porous cladding layer and the sintered at least one porous cladding layer has a chlorine dopant concentration of at least 500 ppm by weight. In embodiments of the method, the first temperature may be at least 800° C., or at least 1050° C., or between 800° C. and 1100° C.; the second temperature may be greater than or equal to the first temperature or the second temperature may be greater than the first temperature; the third temperature may be greater than or equal to the second temperature or the third temperature may be greater than the second temperature or the third temperature may be at least 1100° C., or the third temperature may be at least 1200° C., or the third temperature may be at least 1300° C., or the third temperature may be between 1100° C. and 1500° C.; the chlorine source material may include $Cl_2$, $SiCl_4$, and/or $CCl_4$; the reducing agent may include CO, $CH_3Cl$, $CH_2Cl_2$, and/or $CHCl_3$; and/or the porous cladding layer may have a chlorine dopant concentration of at least 1000 ppm by weight, or at least 2000 ppm by weight, or at least 4000 ppm by weight, or at least 6000 ppm by weight, or at least 8000 ppm by weight, or at least 10000 ppm by weight.

At block 50 of FIG. 6, an optical fiber is drawn from the reducing agent-treated, consolidated optical fiber preform produced after processing according to blocks 46 and 48 of FIG. 6. Suitable techniques and apparatus for drawing optical fiber from a consolidated glass preform are known to those of skill in the art. It will be appreciated that the consolidated glass core of the consolidated optical fiber preform will form the core (or a portion of the core) of the optical fiber and the consolidated cladding layers of the consolidated optical fiber preform will form the cladding portion of the optical fiber.

At block 52 of FIG. 6, the drawn fiber is placed in a deuterium treatment apparatus for treatment with deuterium gas. Suitable apparatus for performing deuterium treatment are known to those of skill in the art. According to some embodiments, the deuterium treatment apparatus includes a chamber for holding the drawn optical fiber, a supply of a deuterium-containing gas, and controls for supplying the deuterium-containing gas to the chamber. The apparatus is adapted to expose the drawn optical fiber placed in the chamber to a selected concentration of deuterium for a selected time at a selected temperature.

The deuterium treatment of the drawn fiber provides a reduction in the concentration of non-bridging oxygen defects in the core of the optical fiber, thereby reducing the sensitivity of the core to environmental hydrogen. Deuterium treatment of fiber is taught, for example, in U.S. Pat. Nos. 6,499,318, 4,623,373. 4,515,612 and 4,685,945.

According to some embodiments, the reducing agent treatment of the cladding soot reduces the deuterium treatment time required to reduce the hydrogen sensitivity of the optical fiber to a targeted level by at least 20% as compared to the required deuterium treatment time for the same optical fiber formed without the reducing agent treatment, but otherwise formed in the same manner. In other embodiments, the required deuterium treatment time is reduced by at least 40% when CO is used as the reducing agent in combination with a step of drying with a low level of chlorine as described in the immediately preceding paragraph.

Methods and apparatus in accordance with embodiments of the present invention may provide advantages and benefits in the manufacture of optical fiber. As discussed above, non-bridging oxygen defects in the core of the drawn optical fiber may bond with environmental hydrogen to form absorption sites in the core, thereby increasing attenuation at wavelengths of concern (e.g. in the telecommunications window). The hydrogen sensitivity of the core can be reduced by deuterium treating the drawn fiber or the consolidated glass preform. However, during the deuterium treatment step, the deuterium of the deuterium-containing gas must diffuse through the cladding portion before diffusing into the core. Non-bridging oxygen defects in the cladding portion tend to consume the deuterium as it diffuses through the cladding portion. Thus, non-bridging oxygen defects in the cladding portion increase the treatment time required to treat the fiber with deuterium. Also, because the deuterium treatment process is limited by the rate of diffusion of the deuterium, the time required to complete the deuterium treatment process is extended. As a result, the rate of the production of the optical fiber may be substantially slowed.

In the methods of the present invention, the reducing agent of the treatment gas removes excess oxygen from the cladding soot so that the removed oxygen is not present following sintering to present non-bridging oxygen defects in the glass cladding of the drawn fiber. As a result, the defect concentration levels in the cladding are reduced. The obviated non-bridging oxygen defects are not present to consume deuterium during the deuterium treatment of the optical fiber core, thereby improving the rate and efficiency of the process and providing shorter deuterium treatment times.

The methods of the present disclosure are particularly important for embodiments where there is more than 500 ppm by weight Cl in the overclad, or greater than 2000 ppm by weight Cl in the overclad, or greater than 4000 ppm by weight Cl in the overclad, or greater than 6000 ppm by weight Cl in the overclad. As is shown in FIG. 5, the Time-to-Peak of the fiber increased with increasing Cl concentration in the overclad. This indicates that the concentration of oxygen-rich defects increases with increasing Cl concentration in the overclad. FIG. 5 also shows that treatment of the cladding soot with a reducing agent as disclosed herein reduced the Time-to-Peak of the fiber, which indicates that treatment with a reducing agent reduces the concentration of oxygen-rich defects in the overclad. A reduced concentration of oxygen-rich defects in the overclad means that manufacturing efficiency is improved because shorter deuterium treatment times are required to achieve a given reduction in the hydrogen sensitivity of the optical fiber. Fibers drawn from preforms that were consolidated in the presence of a reducing agent as described herein have a lower concentration of oxygen-rich defects and require shorter deuterium treatment times to achieve a given hydrogen sensitivity (as measured by TTP) than fibers drawn from preforms that were not consolidated in the presence of a reducing agent.

While the optical fibers, methods and apparatus of the present invention are described above with reference to a step index optical fiber having a reducing agent-treated cladding, the methods and apparatus may be used to form other types of optical fiber as well. For example, the methods and apparatus may be used to form pure silica core step index optical fibers, graded index optical fibers, W-profile optical fibers, pedestal profile optical fibers, or optical fibers having more complicated multi-segment profiles (e.g. including at least a central core, a moat, a ring, and a cladding). The optical fibers may have multiple cladding layers. The cladding layers may be differentially treated with a reducing agent (e.g. one cladding layer may be treated with a reducing agent and another cladding layer may not be treated with a reducing agent). Segments of the physical core other than the central core may be treated with the reducing agent as described above with regard to the reducing agent treatment of the core soot preform. Preferably, such additional core segments are treated with a reducing agent in accordance with the parameters (for example, with regard to increases in baseline attenuation) as discussed above with regard to the core.

Within the scope of the present disclosure is an optical fiber comprising a core and at least one cladding layer, the at least one cladding layer including a chlorine dopant concentration of at least 500 ppm by weight, the optical fiber containing less than 1 ppb by weight of OD groups and having a time-to-peak (TTP) hydrogen aging value at 23° C. of less than 100 hours upon exposure to a gas atmosphere having a total pressure of 1 atm and containing a partial pressure of 0.01 atm $H_2$ and a partial pressure of 0.99 atm $N_2$.

In the examples that follow, characteristics of fibers drawn from the preforms prepared in accordance with the present description are presented. The fibers formed from preforms that are sintered in the absence of $Cl_2$ are shown to have low sensitivity to $H_2$, which means that only minimal deterioration of the properties of the fibers is observed upon exposure and aging of the fibers in the presence of $H_2$. While not wishing to be bound by theory, it is believed that formation and dehydration of the soot cladding monolith in the absence of the core cane and dehydration of the core-cladding assembly formed by inserting the core cane into the internal cavity of the soot cladding monolith lead to low initial concentration of OH in the preform. It is further believed that sintering of the core-cladding assembly in the absence of $Cl_2$, and/or in the absence of another chlorine-containing gas, and/or in the presence of a reducing agent suppresses the formation of NBOHC defects in the fiber preform during the fabrication process. As a result, fibers drawn from the present preforms are expected to have low initial OH concentration and low sensitivity to $H_2$.

EXAMPLES

In the following examples, hydrogen sensitivity of fibers formed from preforms prepared under various conditions is considered. The fibers are uncoated. Hydrogen sensitivity is assessed by determining the increase in fiber absorption at 1383 nm following exposure of the fiber to an $H_2$—$N_2$ gas atmosphere at a total pressure of 1 atm and a temperature of 23° C. The gas atmosphere contains a partial pressure of $H_2$ of 0.01 atm and a partial pressure of $N_2$ of 0.99 atm. When exposed to $H_2$, $H_2$ diffuses radially into the fiber from the outer surface of the cladding. The $H_2$ diffuses into the cladding and continues through to the core of the fiber. The presence of $H_2$ within the fiber induces conversion of non-bridging oxygen hole centers (≡Si—O.) to silanol groups (.Si—OH), where the hydroxyl moiety of the silanol groups exhibit a strong absorption at 1383 nm. The increase in absorption at 1383 nm upon exposure to hydrogen is thus a measure of the extent to which $H_2$ creates hydroxyl groups, which in turn is dependent on the concentration of non-bridging oxygen hole centers in the fiber. Exposure of fibers with a low concentration of non-bridging oxygen hole centers will result in the generation of a low concentration of silanol groups and a correspondingly low increase in absorption at 1383 nm. Conversely, high concentrations of hydroxyl groups will be formed when exposing fibers with high concentrations of non-bridging oxygen hole centers to $H_2$ and a correspondingly high increase in absorption at 1383 nm will occur.

The concentration of non-bridging oxygen hole centers is also related to the time elapsed between the time of exposure of the fiber to $H_2$ and the time at which attenuation of the optical signal due to absorption at 1383 nm is detectable. As the fiber is exposed to $H_2$, $H_2$ passes through the outer surface of the fiber cladding and diffuses toward the core. The mode field distribution of the optical signal, however, does not normally extend to the outer boundary of the cladding. Instead, the optical signal is primarily confined to the core region and includes an evanescent portion that extends to an internal position within the cladding region. Since the mode field distribution of the optical signal does not overlap the outer radial positions of the cladding, the presence of hydrogen-induced hydroxyl groups at outer radial positions of the cladding do not attenuate the optical signal. As time elapses, however, $H_2$ penetrates more deeply into the cladding and eventually forms hydroxyl groups in regions of the fiber that are overlapped by the optical signal. At this point in time, a nearly discontinuous increase in absorption at 1383 nm is detected. The increase in absorption at 1383 nm closely approximates a step function in which the absorption at 1383 nm increases from a low constant value at short times to a high constant level at the point in time when the $H_2$ diffuses sufficiently far into the fiber to form hydroxyl groups in regions overlapped by the optical signal. The elapsed time between the time of exposure of the fiber to $H_2$ and detection of a steep increase in absorption at 1383 nm shall be referred to herein as time-to-peak (TTP). Optical fibers described herein can have diameters of 50 to 300 microns. Optical fibers measured for time-to-peak hydrogen aging are 125 µm in diameter unless otherwise stated.

As an indicator of the depth of penetration of $H_2$ into the fiber, TTP is a measure of the concentration of non-bridging oxygen hole centers. As the concentration of non-bridging oxygen hole centers in the fiber increases, more $H_2$ is depleted in the conversion of non-bridging oxygen hole centers to hydroxyl groups and a longer time of exposure of the fiber to $H_2$ is needed in order for $H_2$ to penetrate sufficiently far to reach regions of the fiber overlapped by the optical signal. For a given fiber configuration and a given optical signal, fibers having a high concentration of non-bridging oxygen hole centers will have longer TTP than fibers having a low concentration of non-bridging oxygen hole centers. Fibers having a long TTP will accordingly have a higher concentration of hydroxyl groups and will exhibit greater attenuation at 1383 nm.

Figure 13:
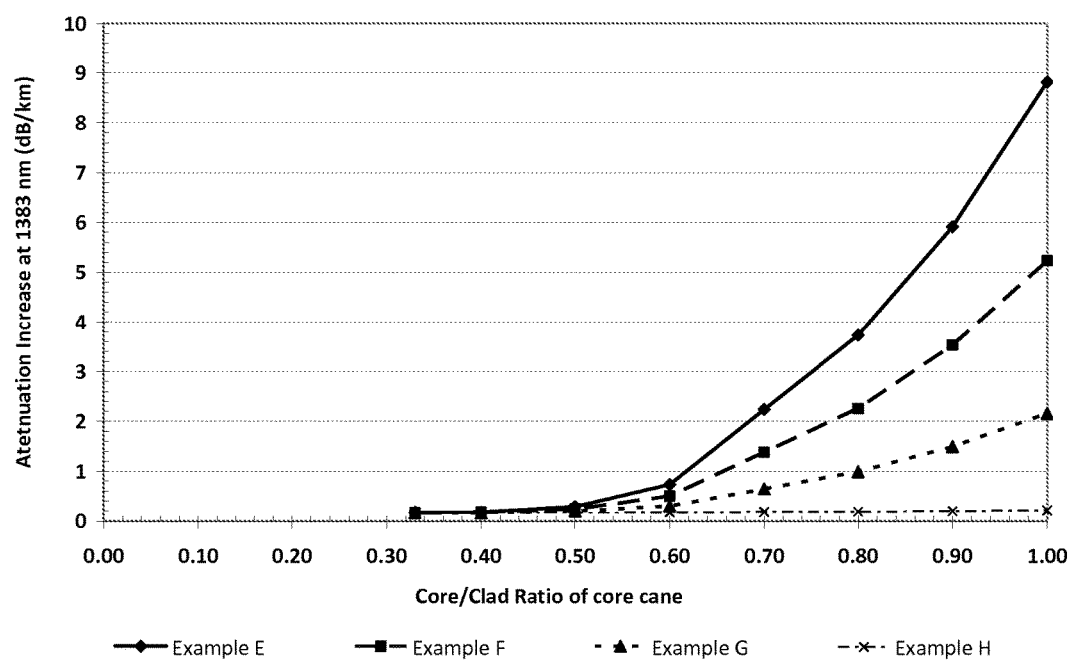
FIG. 13 shows the modeled dependence of signal attenuation at 1380 nm on core-cladding radius ratio for fibers differing in TTP.

FIG. 13 shows modeled hydrogen sensitivity as a function of the ratio of the outer radius of the core to the outer radius of the inner cladding (referred to herein as core/clad ratio or CCR of the core cane and that portion in the corresponding optical fiber). The core canes were inserted into their corresponding soot cladding monoliths, which included internal cavities with center hole diameters larger than the core cane diameter. The quantity of soot on the soot cladding monoliths was adjusted (i.e., accounted for the core cane core/clad ratio) such that the core radii were equivalent for all of the final core-cladding assemblies. These assemblies were dried, doped and consolidated to optical fiber preforms and drawn to 125 µm diameter optical fibers. The cores radii for these fibers were about 6 µm in the fiber space. The core refractive index delta maximum was about 0.4% ($GeO_2$-doped silica) relative to undoped silica and the core had an α-doping profile with α~2.

The model accounted for diffusion of hydrogen into the fiber and provided information on the concentration profiles of hydrogen and hydroxyl groups in the fiber. Hydrogen sensitivity is quantified in terms of the change in attenuation at 1380 nm. Attenuation curves are depicted in FIG. 13 for several series of modeled fiber examples spanning a range of concentration of non-bridging oxygen hole centers (NBOHC) in the outer clad. The mode field distribution of the optical signal included in the model was the same for all modeled fibers. Different concentrations of NBOHC lead to different TTP values, where TTP is based on exposure of the fiber to a gas atmosphere that contains a partial pressure of 0.01 atm $H_2$ and a partial pressure of 0.99 atm $N_2$ at a total pressure of 1 atm and a temperature of 23° C. Within each series of modeled fiber examples, the concentration of non-bridging oxygen hole centers was fixed and the core/clad ratio was varied to produce an attenuation curve shown in FIG. 13. Fibers of series Example E had a concentration of NBOHC in the outer clad of $8.5 \times 10^{15}/cm^3$ and a TTP value of 150 hr. Fibers of series Example F had a concentration of NBOHC in the outer clad of $5 \times 10^{15}/cm^3$ and a TTP value of 114 hr. Fibers of series Example G had a concentration of NBOHC in the outer clad of $2 \times 10^{15}/cm^3$ and a TTP value of 77 hr. Fibers of series Example H had a concentration of NBOHC in the outer clad of $1 \times 10^{14}/cm^3$ and a TTP value of 41 hr.

The modeling results shown for the four series of Example fibers indicated that for a given TTP value, absorption at 1383 nm increases with increasing core/clad ratio of the core cane and that portion in the corresponding optical fiber. The increased absorption is a consequence of a greater concentration of hydroxyl groups in the cladding relative to the core and greater overlap of the mode field of the optical signal with the cladding as the core/clad ratio increases. The model also indicated that for a fixed core/clad ratio, attenuation of the optical signal increases as TTP increases. Fibers having high TTP have a high hydroxyl concentration and thus greater signal attenuation at 1383 nm. The model further shows that the functional dependence of signal attenuation at 1383 nm on core/clad ratio was much greater for fibers having high TTP. The attenuation of the modeled fiber having TTP=40 hr was nearly independent of core/clad ratio, while the modeled fiber having TTP=150 hr exhibited a pronounced increase in attenuation as the core/clad ratio was increased. Thus the lower the NBOHC in the outer clad layer, the lower the TTP. One method described herein to lower NBOHC can be achieved by using reducing agents in the sintering step during processing to form optical fiber preforms. In one embodiment, low NBOHC in the overclad is achieved where during the sintering step, there is no chlorine-containing gas and there is a reducing gas present.

Figure 14:
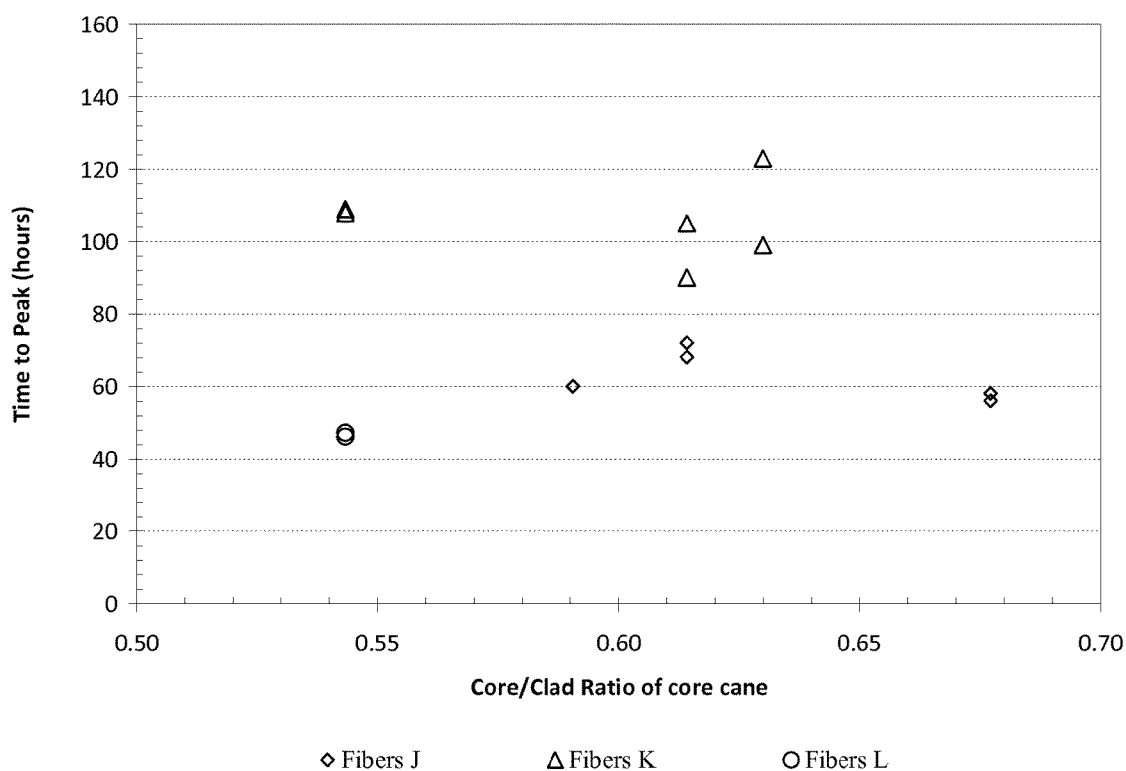
FIG. 14 shows the hydrogen aging response of several fibers drawn from preforms prepared under different conditions of dehydration and/or sintering.

FIG. 14 shows measured TTP values for fibers drawn from preforms formed under various conditions. As noted above, TTP values are based on exposure of the fibers to an ambient that contained a partial pressure of 0.01 atm $H_2$ and 0.99 atm $N_2$ at a total pressure of 1 atm and a temperature of 23° C. Each preform was fabricated by independently fabricating a core cane and soot cladding monolith and combining the core cane and soot cladding monolith to form a core-cladding assembly as described herein. To within experimental uncertainty in processing, identical core canes and soot cladding monoliths were used for each core-cladding assembly. Core canes having a core/clad ratio of between about 0.5 to about 0.7 were inserted into separate soot cladding monoliths having internal cavities with center hole diameters larger than the core cane diameter. The quantity of soot on the soot cladding monoliths was adjusted such that the core radius was the same for all of the final core-cladding assemblies with the soot content varying to provide different CCR values (core cane core/clad ratios). These assemblies were dried, doped and consolidated to optical fiber preforms and drawn to 125 µm diameter optical fibers.

Processing conditions used to form optical fiber preforms from the core-cladding assemblies were as follows: Each core-cladding assembly was placed into a furnace and then dehydrated by flowing $Cl_2$ (0.5 SLPM) and helium (20 SLPM) into and through the furnace. The furnace temperature was about 1100° C. and the time of dehydration was 4 hours. $Cl_2$ (0.1 SLPM) and He (1 SLPM) were also supplied through the handle assembly to the space between the core cane and soot cladding monolith components of the core-cladding assembly and flowed throughout the pores of the soot cladding monolith component of the core-cladding assembly. Dehydration was performed before sintering. Fabrication of the core-cladding assemblies differed in the conditions used during sintering. The $Cl_2$ and He supplied to the space between the core cane and soot cladding monolith vial the preform handle was turned off prior to sintering the core-cladding assemblies. One core-cladding assembly was sintered in a furnace set at 1490° C. for 4 hours in the presence of $Cl_2$ to provide a first consolidated preform. A second core-cladding assembly was sintered in a furnace set at 1490° C. for 4 hours in the absence of $Cl_2$ to provide a second consolidated preform. A third core-cladding assembly was sintered in a furnace set at 1490° C. for 4 hours in the absence of $Cl_2$ and in the presence of flowing CO (0.1 SLPM) and He (9.9 SLPM) to provide a third consolidated preform.

Fibers were drawn from each consolidated preform. The fibers included core and cladding regions with a core radius of about 6 μm and an outer cladding diameter of about 125 μm. The core refractive index delta maximum was about 0.4% ($GeO_2$-doped silica) relative to undoped silica and the core had an α-doping profile with α~2.

FIG. 14 shows measured TTP (time-to-peak) values as a function of core/edge ratio for several fibers drawn from the preforms. Fibers with different core/edge ratios are compared in FIG. 14. Data for fibers drawn from the preform dehydrated in the presence of $Cl_2$ and sintered in the presence of $Cl_2$ are shown with triangle symbols (▲) and are labeled as Fibers J. Fibers J had core/clad ratios of the core canes ranging from 0.54 to about 0.64 and TTP values ranging from about 85 to about 120 hours. Data for fibers drawn from the preform dehydrated in the presence of $Cl_2$ and sintered in the absence of $Cl_2$ are shown with diamond symbols (♦) and are labeled as Fibers K. Fibers K had core/clad ratios of the core canes ranging from 0.59 to about 0.68 and TTP values ranging from about 56 to about 72 hours. Data for fibers drawn from the preform dehydrated in the presence of $Cl_2$ and sintered in the absence of $Cl_2$ and in the presence of CO are shown with circle symbols (●) and are labeled as Fibers L. Fibers L had core/clad ratios of the core canes of about 0.54 and TTP values of about 46 hours.

The results shown in FIG. 14 indicate that fibers drawn from the preform sintered in the presence of $Cl_2$ exhibited the highest TTP values, which indicates that the presence of $Cl_2$ during preform sintering leads to high concentrations of non-bridging oxygen hole centers in fibers drawn from the preforms. A significant reduction in TTP was observed when sintering was performed in the absence of $Cl_2$ and an even greater reduction in TTP was observed when sintering was performed in the absence of $Cl_2$ and the presence of CO. The results indicate that exclusion of $Cl_2$ from the sintering ambient of the preform led to a reduction in the concentration of non-bridging oxygen hole centers and that the presence of CO led to a further reduction in the concentration of non-bridging oxygen hole centers. The lower concentrations of non-bridging oxygen hole centers provides fewer sites for hydrogen-induced conversion of dangling oxygen bonds to hydroxyl groups and provides fibers with low sensitivity to $H_2$ and low anticipated hydrogen-induced absorption at 1383 nm.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

We claim:

1. A method of producing an optical fiber comprising:
providing a porous soot cladding monolith, said soot cladding monolith including a first porous glass cladding layer and having an internal cavity;
inserting a core cane into said internal cavity to form a core-cladding assembly, said core-cladding assembly including a channel between said core cane and said soot cladding monolith;
exposing said core-cladding assembly to a first gas atmosphere at a first temperature, said first gas atmosphere comprising a chlorine source material, said chlorine source material providing chlorine for doping said first porous glass cladding layer;
exposing said core-cladding assembly to a second gas atmosphere at a second temperature, said second gas atmosphere comprising a reducing agent, said reducing agent being CO and having a concentration in said second gas atmosphere greater than 3000 ppm by volume; and
heating said core-cladding assembly in the presence of said second gas atmosphere at a third temperature, said heating causing sintering of said first porous glass cladding layer, said sintered first porous glass cladding layer having a chlorine dopant concentration of at least 500 ppm by weight.

2. The method of claim 1, wherein said first temperature is at least 800° C., said second temperature is greater than or equal to said first temperature, and said third temperature is greater than or equal to said second temperature.

3. The method of claim 2, wherein said first temperature is at least 1050° C.

4. The method of claim 3, wherein said third temperature is at least 1300° C.

5. The method of claim 1, wherein said chlorine source material is $Cl_2$, $SiCl_4$, or $CCl_4$.

6. The method of claim 1, further comprising drawing a fiber from said heated core-cladding assembly having said sintered first porous glass cladding layer.

7. A method of producing an optical fiber comprising:
providing a porous soot cladding monolith, said soot cladding monolith including a first porous glass cladding layer and having an internal cavity;
inserting a core cane into said internal cavity to form a core-cladding assembly, said core-cladding assembly including a channel between said core cane and said soot cladding monolith;
exposing said core-cladding assembly to a first gas atmosphere at a first temperature, said first gas atmosphere comprising a chlorine source material, said chlorine source material providing chlorine for doping said first porous glass cladding layer;
exposing said core-cladding assembly to a second gas atmosphere at a second temperature, said second gas atmosphere comprising said first gas atmosphere and a reducing agent, the volumetric ratio of said reducing agent to said chlorine source material in said second gas atmosphere being greater than 0.010; and
heating said core-cladding assembly in the presence of said second gas atmosphere at a third temperature, said heating causing sintering of said first porous glass cladding layer, said sintered first porous glass cladding layer having a chlorine dopant concentration of at least 500 ppm by weight.

8. The method of claim 7, wherein said first temperature is at least 800° C., said second temperature is greater than or equal to said first temperature, and said third temperature is greater than or equal to said second temperature.

9. The method of claim 8, wherein said first temperature is at least 1050° C. and said third temperature is at least 1300° C.

10. The method of claim 7, wherein said chlorine source material is $Cl_2$, $SiCl_4$, or $CCl_4$.

11. The method of claim 7, wherein said reducing agent is CO, $CH_3Cl$, $CH_2Cl_2$, or $CHCl_3$.

12. The method of claim 7, further comprising drawing a fiber from said heated core-cladding assembly having said sintered first porous glass cladding layer.

13. A method of producing an optical fiber comprising:
providing a porous soot cladding monolith, said soot cladding monolith including a first porous glass cladding layer and having an internal cavity;
inserting a core cane into said internal cavity to form a core-cladding assembly, said core-cladding assembly including a channel between said core cane and said soot cladding monolith;
exposing said core-cladding assembly to a first gas atmosphere at a first temperature, said first gas atmosphere comprising a chlorine source material, said chlorine source material providing chlorine for doping said first porous glass cladding layer;
exposing said core-cladding assembly to a second gas atmosphere at a second temperature, said second gas atmosphere comprising a reducing agent; and
heating said core-cladding assembly in the presence of said second gas atmosphere at a third temperature, said heating causing sintering of said first porous glass cladding layer, said sintered first porous glass cladding layer having a chlorine dopant concentration is greater than 2000 ppm by weight.

14. The method of claim 13, wherein said first temperature is at least 800° C., said second temperature is greater than or equal to said first temperature, and said third temperature is greater than or equal to said second temperature.

15. The method of claim 14, wherein said first temperature is at least 1050° C. and said third temperature is at least 1300° C.

16. The method of claim 13, wherein said chlorine source material is $Cl_2$, $SiCl_4$, or $CCl_4$.

17. The method of claim 13, wherein said reducing agent is CO, $CH_3Cl$, $CH_2Cl_2$, or $CHCl_3$.

18. The method of claim 13, further comprising drawing a fiber from said heated core-cladding assembly having said sintered first porous glass cladding layer.

19. A method of producing an optical fiber comprising:
providing a porous soot cladding monolith, said soot cladding monolith including a first porous glass cladding layer and having an internal cavity, said soot cladding monolith further comprising a second porous glass cladding layer, said second porous glass cladding layer surrounding said first porous glass cladding layer;
inserting a core cane into said internal cavity to form a core-cladding assembly, said core-cladding assembly including a channel between said core cane and said soot cladding monolith;
exposing said core-cladding assembly to a first gas atmosphere at a first temperature, said first gas atmosphere comprising a chlorine source material, said chlorine source material providing chlorine for doping said first porous glass cladding layer;
exposing said core-cladding assembly to a second gas atmosphere at a second temperature, said second gas atmosphere comprising a reducing agent; and
heating said core-cladding assembly in the presence of said second gas atmosphere at a third temperature, said heating causing sintering of said first porous glass cladding layer, said sintered first porous glass cladding layer having a chlorine dopant concentration of at least 500 ppm by weight.

20. The method of claim 19, wherein
said chlorine source material further provides chlorine for doping said second porous glass cladding layer and said heating at said third temperature causes sintering of said second porous glass cladding layer, said chlorine dopant concentration of said sintered first porous glass cladding layer being at least 1000 ppm by weight and said sintered second porous glass cladding layer having a chlorine dopant concentration less than said chlorine dopant concentration of said sintered first porous glass cladding layer.

21. The method of claim 19, wherein said first temperature is at least 800° C., said second temperature is greater than or equal to said first temperature, and said third temperature is greater than or equal to said second temperature.

22. The method of claim 21, wherein said first temperature is at least 1050° C. and said third temperature is at least 1300° C.

23. The method of claim 19, wherein said chlorine source material is $Cl_2$, $SiCl_4$, or $CCl_4$.

24. The method of claim 19, wherein said reducing agent is CO, $CH_3Cl$, $CH_2Cl_2$, or $CHCl_3$.

25. The method of claim 19, further comprising drawing a fiber from said heated core-cladding assembly having said sintered first porous glass cladding layer.

* * * * *